US 12,506,634 B1

United States Patent
Clark et al.

(10) Patent No.: US 12,506,634 B1
(45) Date of Patent: Dec. 23, 2025

(54) DYNAMIC SMART DEVICE DEMONSTRATION

(71) Applicant: Amazon Technologies, Inc., Seattle, WA (US)

(72) Inventors: Dustin D Clark, Austin, TX (US); Giuseppe Leonardo Mancone, Seattle, WA (US); Kathleen Patricia Champion, Seattle, WA (US); Kunal Pramod Ghogale, Redmond, WA (US); Tushar Joshi, Seattle, WA (US); George Strajan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 577 days.

(21) Appl. No.: 17/944,651

(22) Filed: Sep. 14, 2022

(51) Int. Cl.
*H04L 12/28* (2006.01)
*G06F 3/16* (2006.01)
*G10L 17/22* (2013.01)

(52) U.S. Cl.
CPC ............ *H04L 12/282* (2013.01); *G06F 3/167* (2013.01); *G10L 17/22* (2013.01)

(58) Field of Classification Search
CPC ........ G10L 17/22; G06F 3/167; H04L 12/282
See application file for complete search history.

(56) References Cited

U.S. PATENT DOCUMENTS

| | | | | |
|---|---|---|---|---|
| 11,721,331 B1* | 8/2023 | Kinsey | ................... | G06F 3/167 |
| | | | | 704/275 |
| 11,729,264 B1* | 8/2023 | Passaglia | ................ | H04L 67/51 |
| | | | | 709/224 |
| 2016/0300316 A1* | 10/2016 | Beseda | ................ | G06Q 30/012 |
| 2019/0258367 A1* | 8/2019 | Root | ...................... | G06F 3/0484 |
| 2020/0174734 A1* | 6/2020 | Gomes | ...................... | H04R 1/10 |
| 2020/0174735 A1* | 6/2020 | Gomes | ................... | G06F 3/165 |
| 2023/0087133 A1* | 3/2023 | Karri | ...................... | G06N 20/00 |
| | | | | 706/12 |
| 2024/0370130 A1* | 11/2024 | Baer | ................... | G06Q 30/0623 |

FOREIGN PATENT DOCUMENTS

CN 108831469 B * 2/2021 ............ G10L 15/22

* cited by examiner

*Primary Examiner* — Vincent H Tran
(74) *Attorney, Agent, or Firm* — Nicholson De Vos Webster & Elliott LLP

(57) ABSTRACT

Systems and methods for dynamic smart device demonstration include receiving a user request to initiate a smart device demonstration. Device groups for the devices in the environment in question are determined and/or generated and utilized to determine what devices and functionalities are to be included in a given smart device demonstration. Then data representing device functionality descriptions are utilized to output those descriptions in synchronization with device state transitions of the smart devices, which demonstrate the described functionality.

20 Claims, 16 Drawing Sheets

DYNAMIC SMART DEVICE DEMONSTRATION

BACKGROUND

Internet-of-things devices have become more common in homes and other environments. Some of these devices are operated by users that are unfamiliar with such devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a flow diagram of an example process for identifying devices to perform a smart device demonstration with.

DETAILED DESCRIPTION

Figure 1:
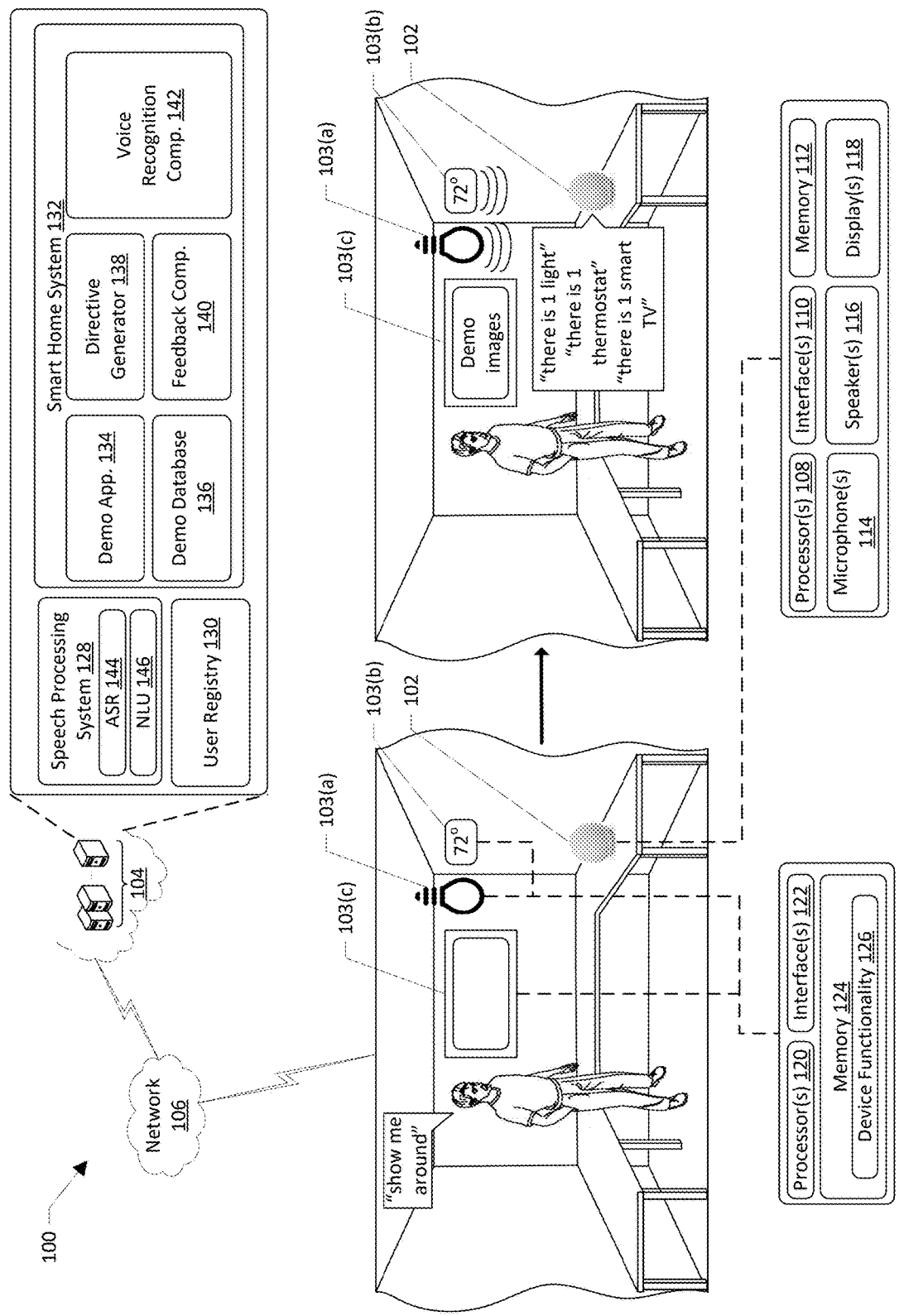
FIG. 1 illustrates a schematic diagram of an example environment for dynamic smart device demonstration.

Systems and methods for dynamic smart device demonstrations are disclosed. Take, for example, an environment (such as a home, hotel, vehicle, office, store, restaurant, or other space) where one or more users may be present. The environments may include one or more electronic devices that may be utilized by the users or may otherwise be utilized to detect and/or control conditions associated with the environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), wearable devices (e.g., smart watch, earbuds, healthcare devices), transportation devices (e.g., cars, bicycles, scooters, etc.), televisions and/or monitors, smart thermostats, security systems (including motion sensors and open/close sensors, including sensors that indicate whether a security system is armed, disarmed, or in a "home mode), smart cameras (e.g., home security cameras), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example.

In these and other scenarios, there may be users that are unfamiliar with the smart devices in a given space and/or there may be users that are unfamiliar with certain functionalities and/or routines that one or more of the smart devices can perform. As described herein, functionalities of devices include actions that may be performed by a smart device, such as a smart light having the functionalities of turning the light on or off, changing the color of the light, and/or changing the brightness of the light. Routines as described herein may include actions performed by smart devices when a trigger event occurs (e.g., a set of actions using the functionalities of a set of devices in response to the trigger). In examples, functionalities of smart devices are utilized in association with routines. For example, a given user may have setup smart devices in a given space but another person, such as a spouse or a child, may not be as familiar with the smart devices as the person that setup the smart devices. In another example, a user may be visiting a certain location, such as a hotel, a temporary residence, etc. and may not have prior knowledge of the smart devices in the space the user is in. Additionally, some or all of these smart devices may be voice enabled or otherwise may be configured to be controlled using voice commands provided to one or more voice interface devices. However, the user may not have prior knowledge of what the device names are for the devices and/or what voice commands are available for the various devices. In these and other examples, a user may desire to learn what smart devices are in a given space and/or what functionalities those smart devices perform.

To do so, a user may provide user input indicating an intent to initiate a smart device demonstration. In some examples, the user input may correspond to speech input received at a voice interface device. In these examples, the voice interface device may capture audio representing the speech input and the voice interface device and/or a speech processing system may analyze corresponding audio data to determine that the speech input represents a request to initiate a smart device demonstration. In examples, the speech input may be "show me around," "demonstrate devices," and/or any other voice command evidencing an intent to initiate a smart device demonstration. Thereafter, a demonstration application configured to handle intents associated with smart device demonstrations may be called to determine what devices are to be selected for the demonstration at issue. To do so, the demonstration application may receive and utilize a device identifier associated with the voice interface device that received the speech input. The device identifier may be utilized to determine associated account data for the voice interface device. In other examples, instead of utilizing a device identifier, contextual data associated with the environment in which the voice interface device is situated may be utilized to determine the account data at issue and/or to determine what devices are proximate to the voice interface device when the demonstration request is received. This contextual data may include any data described herein for determining device groups, for example. The account device may include indicators of other smart devices that are associated with the voice interface device, as well as, in examples, indicators of device groups that have been setup in association with the account data. For example, the account data may indicate that the voice interface device is associated with two smart lights, a smart television, and a smart thermostat. The account data may also provide naming indicators for the smart devices and the voice interface device. Additionally, the account data may indicate that the voice interface device is in a device group with one or more of the smart devices, including, by way of example, the two smart lights.

The demonstration application may utilize some or all of this data to determine device groups for the devices in question such that the device groups can be utilized to determine which devices the user desires the system to demonstration. For example, a given environment may have two device groups associated therewith, and the device groups may be labeled "kitchen devices" and "living room devices." The demonstration application may identify these device groups and request user input selecting which of the device groups to demonstrate and/or which to demonstrate first. In other examples, a least one smart device may not be associated with a device group that a user has previously setup. In these and other examples, the demonstration application may infer device groups based at least in part on data available to the demonstration application. Such data may include, for example, received signal strength indicator (RSSI) values indicating signal strength as between various devices, naming indicators of devices indicating which devices have similar and different names, device affinity data indicating how frequently a given voice interface device has been utilized to control various smart devices, device communication data indicating which devices are in shortrange communication with each other, such as via a Bluetooth® and/or other shortrange communication protocol, etc. In these examples, the demonstration application may be configured to determine which smart devices are associated with a given space and may, at least for the purpose of performing the smart device demonstration, generate a device group that includes the smart devices in the space.

In addition to determining which devices to associate with a smart device demonstration, the demonstration application may also be configured to determine which device functionalities to demonstrate. In some examples, a given device may have only a single functionality, such as a smart garage door opener that can open or close a garage door. However, many other smart device have multiple functionalities, such as a smart light that can turn on and off, can control brightness of emitted light, and/or can change light emission color. In these examples, the demonstration application may determine whether all or some of the available functionalities of a given smart device should be demonstrated. To do so, the demonstration application may query the user for user input on which identified functionalities should be generated. In other examples, the demonstration application may determine whether the number of functionalities satisfies a threshold number of functionalities and thus are few enough to all be demonstrated in a relatively short period of time. For example, even though a smart light may be configured to turn on and off, adjust brightness, and adjust color, these three functionalities can be demonstrated relevantly quickly, such as in a manner of a few seconds. However, a smart television may have comparatively many more functionalities, such as turning on and off, changing what could be hundreds of channels, adjusting volume, adjusting brightness, adjusting picture modes, switching inputs, switching displayed applications, downloading content, etc. In this example, the demonstration application may determine functionalities to select for the demonstration at issue based at least in part on feedback from prior demonstrations, anticipated amount of time to demonstrate each functionality, number of device types to be demonstrated, number of groups associated with an environment, and/or any other data that may evidence likelihood that the demonstration will be performed to the satisfaction of the user.

Once the devices and functionalities are selected for a given demonstration, a demonstration database may be queried for data to be utilized to perform the demonstration. This data may include audio data, text data, and/or image data representing a description of the device(s) and/or functionalities to be demonstrated. For example, if functionality of a smart device is to be demonstrated, the data may include a description such as "this group includes one smart light; you can ask me to turn the light on and off, to dim the light, or to change the light's color." Similar functionality descriptions for other device types may have been previously generated and stored in the demonstration database for retrieval. As such, the device type(s) of the device(s) at issue as well as the functionalities may be utilized to determine which data to query from the demonstration database. Additionally, in examples, the descriptions may be customized for a given demonstration. For example, the specific group name may be inserted into the description, such as "there are two lights in this living room group." In these examples, inserting the group name into a description may be performed utilizing natural language generation (NLG). NLG may include a process for producing natural language output. In examples, artificial intelligence and computational linguistics may be utilized to produce understandable texts in English or other language as appropriate from underlying non-linguistic representations of information. The NLG process may generate text to be utilized in synthesized speech using a list of canned text that available to the system at issue. In other NLG processes, multiple stages of planning and merging information to enable the generation of text that looks natural and does not become repetitive may be utilized. Those stages may include content determination, here based on the specific group name, document structuring to organize the information to be conveyed, aggregation to merge similar sentences and/or words to improve readability, lexical choice, referring expression generation to identity objects, regions, or other known items, and realization where the text to be utilized is actually created.

In other examples, at least a portion of the functionality descriptions may be generated on the fly in response to receiving the request to initiate the smart device demonstration. In examples where the description is to be output audibly, a text to speech (TTS) component may be configured to generate the audio data of the description. In other examples, the data queried from the demonstration database may be text data and/or image data configured to be displayed on one or more devices. For example, the voice interface device that received the request to initiate the smart device demonstration may be a multi-modal device that includes a screen. In this example, the functionality description(s) may be presented as text and/or an image on the screen in addition to, or instead of, output of an audible version of the description. In still other examples, the text and/or images associated with the functionality description(s) may be output on another device in the environment other than the voice interface device that received the request. For example, one of the smart devices may display the functionality description(s) and/or a user device associated with the user in question (such as a personal phone) may display the functionality description(s). It should be understood that when a voice interface device is described herein, that voice interface device itself may be a personal phone.

In addition to determining and/or generating data representing the functionality description(s), a directive generator may be configured to generate one or more directives configured to cause device state transitions to be performed by the smart devices while the functionality descriptions are output. Just by way of example, the directives may be configured to cause device state transitions such as turning a device on or off, adjusting light brightness, adjusting light color, adjusting temperature settings, operation of a smart television, operation of a smart appliance, operation of a smart speaker, operation of smart window treatments, and/or any other operations that may be performed by a smart device of any kind. The demonstration application may request generation of the relevant directives based at least in part on the selected functionality descriptions. The demonstration application may then be configured to send the data representing the functionality description(s) and the directive(s) to the voice interface device and/or one or more of the smart devices. In addition, the demonstration application may also send data to be utilized by the voice interface device and/or one or more of the smart devices to synchronize output of the functionality description(s) with device state transitions caused by the directive(s). For example, when functionality descriptions for a smart light are output such as "there are two lights," the directives may be sent to the two smart lights to cause those smart lights to turn on and/or off as a visual identifier of which lights are the smart lights. The demonstration may continue with, "you can dim . . . or brighten the lights." When this portion of the demonstration is occurring, directives may be sent to the two smart lights to first dim the lights when "you can dim" is output, and then to brighten the lights when "or brighten the lights" is output. By so doing, use of the described functionality may be demonstrated while the functionality description is being output.

In addition to the above, a feedback component may be configured to receive and utilize feedback data indicating positive and negative user interactions with smart device demonstrations. This feedback data may be generated from explicit user interactions such as a user providing input in response to a request for input on a given demonstration and/or when a user expresses frustration or otherwise a negative interaction with the demonstration such as the user saying, "stop this demonstration." In other examples, the feedback data may be generated from implicit user interactions, such as a user ceasing dialog with the voice interface device during the demonstration (e.g., "would you like to see a demonstration of the next group?" and then the user does not respond). In these and other examples, the feedback data may be generated and may be utilized to determine what device types, device functionalities, and/or device groups to subsequently demonstrate and/or how to order or otherwise rank these demonstrations.

Additionally, a voice recognition component may be configured to identify a speaker of the request to initiate a smart device demonstration. For example, when a user provides speech input requesting a demonstration, audio data representing the speech input may be generated and attributes of the audio data may be compared to stored voice signatures associated with user profiles known to the speech processing system. This comparison may be utilized to identify the user profile that corresponds to the attributes of the audio data. Once a user profile has been identified, prior user interactions associated with the user profile may be utilized to customize a smart device demonstration. For example, the prior user interactions may indicate that the user in question has already requested use of one or more of the smart devices and/or one or more of the functionalities in the environment. This data may be utilized to determine that these previously-used devices and/or functionalities should not be included in the smart device demonstration. Other data from the user profile, including a degree of smart device usage in general, a length of time that the user profile has been active, a number of device and/or device types associated with the user profile, etc. may be utilized to determine how to customize a given smart device demonstration for that user.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for dynamic smart device demonstrations. The system 100 may include, for example, a voice interface device 102 and one or more smart devices 103(a)-(c). In certain examples, the devices 103(a)-(c) themselves may be a voice-enabled device (e.g., smart speaker devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices 102, 103(a)-(c) may be situated in a home, place of business, healthcare facility (e.g., hospital, doctor's office, pharmacy, etc.), in a vehicle (e.g., airplane, truck, car, bus, etc.), and/or in a public forum (e.g., shopping center, store, hotel, etc.), for example. The devices 102, 103(a)-(c) may be configured to send data to and/or receive data from a system 104, such as via a network 106. It should be understood that where operations are described herein as being performed by the system 104, some or all of those operations may be performed by the devices 102, 103(a)-(c). It should also be understood that anytime the system 104 is referenced, that system may include any system and/or device, whether local to an environment of the devices 102, 103(a)-(c) or remote from that environment. Additionally, it should be understood that a given space and/or environment may include numerous devices 102, 103(a)-(c). It should also be understood that when a "space" or "environment" is used herein, those terms mean an area of any size and delineation and can include but are not necessarily limited to a given room, building, or other structure, unless otherwise specifically described as such.

The voice interface device 102 may include one or more components, such as, for example, one or more processors 108, one or more network interfaces 110, memory 112, one or more microphones 114, one or more speakers 116, and/or one or more displays 118. The microphones 114 may be configured to capture audio, such as user utterances, and generate corresponding audio data. The speakers 116 may be configured to output audio, such as audio corresponding to audio data received from another device. The displays 118 may be configured to display images corresponding to image data, such as image data received from the system 104. The voice interface device 102 may be configured to detect an environmental condition associated with the devices 103(a)-(c) and/or the environment associated with the devices 103(a)-(c). Some example sensors that may be utilized to detect conditions may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors, usage data and/or account data may be utilized to determine if an environmental condition is present. In examples, the sensors may also include radar and/or ultrasonic sensors.

With respect to the smart devices 103(a)-(c), they may include one or more processors 120, one or more network interfaces 122, and/or memory 124. Additionally, the memory 124 may include components such as device functionality 126. The device functionality 126 may include functionality specific to a device 103(a)-(c), such as functionality for turning a light on and off, changing light color and/or brightness, controlling a locking mechanism, adjusting temperature settings, and/or any other functionality associated with a smart device.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 104 may include components such as, for example, a speech processing system 128, a user registry 130, and/or a smart home system 132. The smart home system 132 may include one or more components such as a demonstration application 134, a demonstration database 136, a directive generator 138, a feedback component 140, and/or a voice recognition component 142. It should be understood that while the components of the system 104 are depicted and/or described as separate from each other in FIG. 1, some or all of the components may be a part of the same system. The speech processing system 128 may include an automatic speech recognition component (ASR) 144 and/or a natural language understanding component (NLU) 146. Each of the components described herein with respect to the system 104 may be associated with their own systems, which collectively may be referred to herein as the system 104, and/or some or all of the components may be associated with a single system. Additionally, the system 104 may include one or more applications, which may be described as skills. "Skills," as described herein may be applications and/or may be a subset of an application. For example, a skill may receive data representing an intent. For example, an intent may be determined by the NLU component 146 and/or as determined from user input via a computing device. Skills may be configured to utilize the intent to output data for input to a text-to-speech component, a link or other resource locator for audio data, and/or a command to a device, such as the devices 103(a)-(c). "Skills" may include applications running on devices, such as the devices 103(a)-(c), and/or may include portions that interface with voice user interfaces of devices 103(a)-(c).

In instances where a voice-enabled device is utilized, skills may extend the functionality of devices 103(a)-(c) that can be controlled by users utilizing a voice-user interface. In some examples, skills may be a type of application that may be useable in association with target devices 103(a)-(c) and may have been developed specifically to work in connection with given target devices 103(a)-(c). Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

Additionally, the operations and/or functionalities associated with and/or described with respect to the components of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 104, the user registry 130 may be configured to determine and/or generate associations between users, user accounts, environment identifiers, and/or devices. For example, one or more associations between user accounts may be identified, determined, and/or generated by the user registry 130. The user registry 130 may additionally store information indicating one or more applications and/or resources accessible to and/or enabled for a given user account. Additionally, the user registry 130 may include information indicating device identifiers, such as naming identifiers, associated with a given user account, as well as device types associated with the device identifiers. The user registry 130 may also include information indicating user account identifiers, naming indicators of devices associated with user accounts, and/or associations between devices, such as the devices 103(a)-(c). The user registry 130 may also include information associated with usage of the devices 103(a)-(c). It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 128 may be configured to receive audio data from the devices 103(a)-(c) and/or other devices and perform speech-processing operations. For example, the ASR component 144 may be configured to generate text data corresponding to the audio data, and the NLU component 146 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "turn on bedrooms lights," the NLU component 146 may identify a "smart home" intent. In this example where the intent data indicates an intent to cause a smart device to operate, the speech processing system 128 may call one or more speechlets and/or applications to effectuate the intent, such as the smart home system 132. Speechlets, as described herein may otherwise be described as applications and may include functionality for utilizing intent data to generate directives and/or instructions. A speechlet of the smart home system 132 may be designated as being configured to handle the intent of causing smart devices to perform actions, for example. The smart home system 132 may receive the intent data and/or other data associated with the user utterance from the NLU component 146, such as by an orchestrator of the system 104, and may perform operations to cause an action to be performed by the device in question, for example. The system 104 may generate audio data confirming that the action has been performed, such as by a text-to-speech component. The audio data may be sent from the system 104 to one or more of the devices 103(a)-(c).

The components of the system 100 are described below by way of example. To illustrate, there may be users that are unfamiliar with the smart devices 103(a)-(c) in a given space and/or there may be users that are unfamiliar with certain functionalities and/or routines that one or more of the smart devices 103(a)-(c) can perform. For example, a given user may have setup smart devices 103(a)-(c) in a given space but another person, such as a spouse or a child, may not be as familiar with the smart devices 103(a)-(c) as the person that setup the smart devices 103(a)-(c). In another example, a user may be visiting a certain location, such as a hotel, a temporary residence, etc. and may not have prior knowledge of the smart devices 103(a)-(c) in the space in question. Additionally, some or all of these smart devices 103(a)-(c) may be voice enabled or otherwise may be configured to be controlled using voice commands provided to one or more voice interface devices 102. However, the user may not have any prior knowledge on what the device names are for the devices 103(a)-(c) and/or what voice commands are available for the various devices 103(a)-(c). In these and other examples, a user may desire to learn what smart devices 103(a)-(c) are in a given space and/or what functionalities those smart devices 103(a)-(c) perform.

To do so, a user may provide user input indicating an intent to initiate a smart device demonstration. In some examples, the user input may correspond to speech input received at a voice interface device 102. In these examples, the voice interface device 102 may capture audio representing the speech input and the voice interface device 102 and/or the speech processing system 128 may analyze corresponding audio data to determine that the speech input corresponds to a request to initiate a smart device demonstration. In examples, the speech input may be "show me around," "demonstrate devices," and/or any other voice command evidencing an intent to initiate a smart device demonstration. Thereafter, the demonstration application 134 configured to handle intents associated with smart device demonstrations may be called to determine what devices are to be selected for the demonstration at issue. In examples, speech processing may be performed on the user utterance to determine an intent associated with the user utterance. Certain intents may be associated with certain skills, and the system 104 may be configured to determine which skill is associated with the determined intent. Here, the intent of "show me around" or similar may be associated with the demonstration application 134, which may be considered a skill, and the system 104 may select the demonstration application 134 to receive the data representing the user utterance for use by the demonstration application 134 for providing a response to the user utterance.

To do so, the demonstration application 134 may receive and utilize a device identifier associated with the voice interface device 102 that received the speech input. The device identifier may be utilized to determine associated account data for the voice interface device 102. The account data may include indicators of smart devices 103(a)-(c) that are associated with the voice interface device 102, as well as, in examples, indicators of device groups that have been setup in association with the account data. For example, the account data may indicate that the voice interface device 102 is associated with two smart lights, a smart television, and a smart thermostat. The account data may also provide naming indicators for the smart devices 103(a)-(c) and the voice interface device 102. Additionally, the account data may indicate that the voice interface device 102 is in a device group with one or more of the smart devices 103(a)-(c), including, by way of example, the two smart lights.

The demonstration application 134 may utilize some or all of this data to determine device groups for the devices 102, 103(a)-(c) in question such that the device groups can be utilized to determine which devices the user desires the system 104 to demonstration. For example, a given environment may have two device groups associated therewith, and the device groups may be labeled "kitchen devices" and "living room devices." The demonstration application 134 may identify these device groups and request user input selecting which of the device groups to demonstrate and/or which to demonstrate first. In other examples, a least one smart device 103(a)-(c) may not be associated with a device group that a user has previously setup. In these and other examples, the demonstration application 134 may infer device groups based at least in part on data available to the demonstration application 134. Such data may include, for example, RSSI values indicating signal strength as between various devices 102, 103(a)-(c), naming indicators of devices 102, 103(a)-(c) indicating which devices 102, 103(a)-(c) have similar and different names, device affinity data indicating how frequently a given voice interface device 102 has been utilized to control various smart devices 103(a)-(c), device communication data indicating which devices 102, 103(a)-(c) are in shortrange communication with each other, such as via a Bluetooth® and/or other shortrange communication protocol, etc. In these examples, the demonstration application 134 may be configured to determine which smart devices 103(a)-(c) are associated with a given space and may, at least for the purpose of performing the smart device demonstration, generate a device group that includes the smart devices 103(a)-(c) in the space.

In addition to determining which devices 102, 103(a)-(c) to associate with a smart device demonstration, the demonstration application 134 may also be configured to determine which device functionalities to demonstrate. In some examples, a given device 103(a)-(c) may have only a single functionality, such as a smart garage door opener that can open or close a garage door. However, many other smart devices 103(a)-(c) have multiple functionalities, such as a smart light that can turn on and off, can control brightness of emitted light, and/or can change light emission color. In these examples, the demonstration application 134 may determine whether all or some of the available functionalities of a given smart device 103(a)-(c) should be demonstrated. To do so, the demonstration application 134 may query the user for user input on which identified functionalities should be generated. In other examples, the demonstration application 134 may determine whether the number of functionalities satisfies a threshold number of functionalities and thus are few enough to all be demonstrated in a relatively short period of time. For example, even though a smart light 103(a) may be configured to turn on and off, adjust brightness, and adjust color, these three functionalities can be demonstrated relevantly quickly, such as in a manner of a few seconds. However, a smart television 103(c) may have comparatively many more functionalities, such as turning on and off, changing what could be hundreds of channels, adjusting volume, adjusting brightness, adjusting picture modes, switching inputs, switching displayed applications, downloading content, etc. In this example, the demonstration application 134 may determine functionalities to select for the demonstration at issue based at least in part on feedback from prior demonstrations, anticipated amount of time to demonstrate each functionality, number of device types to be demonstrated, number of groups associated with an environment, and/or any other data that may evidence likelihood that the demonstration will be performed to the satisfaction of the user.

Once the devices 102, 103(a)-(c) and functionalities are selected for a given demonstration, the demonstration database 136 may be queried for data to be utilized to perform the demonstration. This data may include audio data, text data, and/or image data representing a description of the device(s) 102, 103(a)-(c) and/or functionalities to be demonstrated. For example, if functionality of a smart device 103(a)-(c) is to be demonstrated, the data may include a description such as "this group includes one smart light; you can ask me to turn the light on and off, to dim the light, or to change the light's color." Similar functionality descriptions for other device types may have been previously generated and stored in the demonstration database 136 for retrieval. As such, the device type(s) of the device(s) 102, 103(a)-(c) at issue as well as the functionalities may be utilized to determine which data to query from the demonstration database 136. Additionally, in examples, the descriptions may be customized for a given demonstration. For example, the specific group name may be inserted into the description, such as "there are two lights in this living room group." In other examples, at least a portion of the functionality descriptions may be generated on the fly in response to receiving the request to initiate the smart device demonstration. For example, instead of querying the demonstration database 136 for already-generated functionality descriptions, the demonstration application 134 may generate the functionality descriptions based at least in part on receiving the request to demonstrate smart devices. In examples where the description is to be output audibly, a TTS component may be configured to generate the audio data of the description to be utilized to output corresponding audio to the user. In other examples, the data queried from the demonstration database 136 may be text data and/or image data configured to be displayed on one or more devices 102, 103(a)-(c). For example, the voice interface device 102 that received the request to initiate the smart device demonstration may be a multi-modal device that includes a screen. In this example, the functionality description(s) may be presented as text and/or an image on the screen in addition to, or instead of, output of an audible version of the description. In still other examples, the text and/or images associated with the functionality description(s) may be output on another device 103(a)-(c) in the environment other than the voice interface device 102 that received the request. For example, one of the smart devices 103(a)-(c) may display the functionality description(s) and/or a user device associated with the user in question (such as a personal phone) may display the functionality description(s).

In addition to determining and/or generating data representing the functionality description(s), the directive generator 138 may be configured to generate one or more directives configured to cause device state transitions to be performed by the smart devices 103(a)-(c) while the functionality descriptions are output. Just by way of example, the directives may be configured to cause device state transitions such as turning a device on or off, adjusting light brightness, adjusting light color, adjusting temperature settings, operation of a smart television, operation of a smart appliance, operation of a smart speaker, operation of smart window treatments, and/or any other operations that may be performed by a smart device 103(a)-(c) of any kind. The demonstration application 134 may request generation of the relevant directives based at least in part on the selected functionality descriptions. The demonstration application 134 may then be configured to send the data representing the functionality description(s) and the directive(s) to the voice interface device 102 and/or one or more of the smart devices 103(a)-(c). In addition, the demonstration application 134 may also send data to be utilized by the voice interface device 102 and/or one or more of the smart devices 103(a)-(c) to synchronize output of the functionality description(s) with device state transitions caused by the directive(s). For example, when functionality descriptions for a smart light are output such as "there are two lights," the directives may be sent to the two smart lights 103(a) to cause those smart lights to turn on and/or off as a visual identifier of which lights are the smart lights. The demonstration may continue with, "you can dim . . . or brighten the lights." When this portion of the demonstration is occurring, directives may be sent to the two smart lights 103(a) to first dim the lights when "you can dim" is output, and then to brighten the lights when "or brighten the lights" is output. By so doing, use of the described functionality may be demonstrated while the functionality description is being output.

In these examples, the directives may first be received by a voice interface device 102 and/or the directives may be generated by the voice interface device 102. The voice interface device 102 may then send the directives to the one or more smart devices 103(a)-(c) as necessary to cause those smart devices 103(a)-(c) to perform operations associated with the directives. In some examples, an identifier of the smart device 103(a)-(c) may be included in a given directive and may be utilized to determine which smart device 103(a)-(c) to send the directive to. In the example where a directive is sent as part of a smart device demonstration, the voice interface device 102 may be configured to determine when to send the directives based at least in part on when the voice interface 102 outputs the functionality descriptions as described herein. In this example, the voice interface 102 determines when the smart devices 103(a)-(c) should perform actions associated with the demonstration and may send the directives when such actions are to be performed. In other examples, the voice interface device 102 may send the directives at the outset of the demonstration along with instructions for the smart devices 103(a)-(c) to determine when to perform the associated actions. In still other examples, the directives may be sent directly to the smart devices 103(a)-(c) and/or a system associated with the smart devices 103(a)-(c) with a timestamp and/or other time-related data indicating when the demonstrated actions should be performed.

In addition to the above, the feedback component 140 may be configured to receive and utilize feedback data indicating positive and negative user interactions with smart device demonstrations. This feedback data may be generated from explicit user interactions such as a user providing input in response to a request for input on a given demonstration and/or when a user expresses frustration or otherwise a negative interaction with the demonstration such as the user saying, "stop this demonstration." In other examples, the feedback data may be generated from implicit user interactions, such as a user ceasing dialog with the voice interface device during the demonstration (e.g., "would you like to see a demonstration of the next group?" and then the user does not respond). In these and other examples, the feedback data may be generated and may be utilized to determine what device types, device functionalities, and/or device groups to subsequently demonstrate and/or how to order or otherwise rank these demonstrations.

Additionally, the voice recognition component 142 may be configured to identify a speaker of the request to initiate a smart device demonstration. For example, when a user provides speech input requesting a demonstration, audio data representing the speech input may be generated and attributes of the audio data may be compared to stored voice signatures associated with user profiles known to the speech processing system 128. This comparison may be utilized to identify the user profile that corresponds to the attributes of the audio data. Once a user profile has been identified, prior user interactions associated with the user profile may be utilized to customize a smart device demonstration. For example, the prior user interactions may indicate that the user in question has already requested use of one or more of the smart devices 103(a)-(c) and/or one or more of the functionalities in the environment. This data may be utilized to determine that these previously-used devices and/or functionalities should not be included in the smart device demonstration. Other data from the user profile, including a degree of smart device usage in general, a length of time that the user profile has been active, a number of devices and/or device types associated with the user profile, etc. may be utilized to determine how to customize a given smart device demonstration for that user.

As used herein, the one or more models and/or the components responsible for determining which devices and functionalities to include in a demonstration may be machine learning models. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with the prior smart device demonstrations and/or feedback data. The models may be trained for multiple user accounts and/or for a specific user account. As such, the machine learning models may be configured to learn, without human intervention, attributes of collected data and/or actions taken associated with device usage cessation.

It should be noted that while text data is described as a type of data utilized to communicate between various components of the system 104 and/or other systems and/or devices, the components of the system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102, 103(*a*)-(*c*).

As shown in FIG. 1, several of the components of the system 104 and the associated functionality of those components as described herein may be performed by one or more of the devices 102, 103(*a*)-(*c*). Additionally, or alternatively, some or all of the components and/or functionalities associated with the devices 102, 103(*a*)-(*c*) may be performed by the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108, 120, and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108, 120, and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108, 120, and/or the processor(s) described with respect to the components of the system 104 may possess its own local memory, which also may store program components, program data, and/or one or more operating systems.

The memory 112, 124 and/or the memory described with respect to the components of the system 104 may include volatile and nonvolatile memory, removable and non-removable media implemented in any method or technology for storage of information, such as computer-readable instructions, data structures, program component, or other data. Such memory 112, 124, and/or the memory described with respect to the components of the system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112, 124, and/or the memory described with respect to the components of the system 104 may be implemented as computer-readable storage media ("CRSM"), which may be any available physical media accessible by the processor(s) 108, 120, and/or the processor(s) described with respect to the system 104 to execute instructions stored on the memory 112, 124, and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112, 124, and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110, 122, and/or the network interface(s) described with respect to the components of the system 104 may enable messages between the components and/or devices shown in system 100 and/or with one or more other polling systems, as well as other networked devices. Such network interface(s) 110, 122, and/or the network interface(s) described with respect to the components of the system 104 may include one or more network interface controllers (NICs) or other types of transceiver devices to send and receive messages over the network 106.

For instance, each of the network interface(s) 110, 122, and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110, 122, and/or the network interface(s) described with respect to the components of the system 104 may include a wide area network (WAN) component to enable message over a wide area network.

In some instances, the system 104 may be local to an environment associated the devices 102, 103(a)-(c). For instance, the system 104 may be located within one or more of the devices 102, 103(a)-(c). In some instances, some or all of the functionality of the system 104 may be performed by one or more of the devices 102, 103(a)-(c). Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
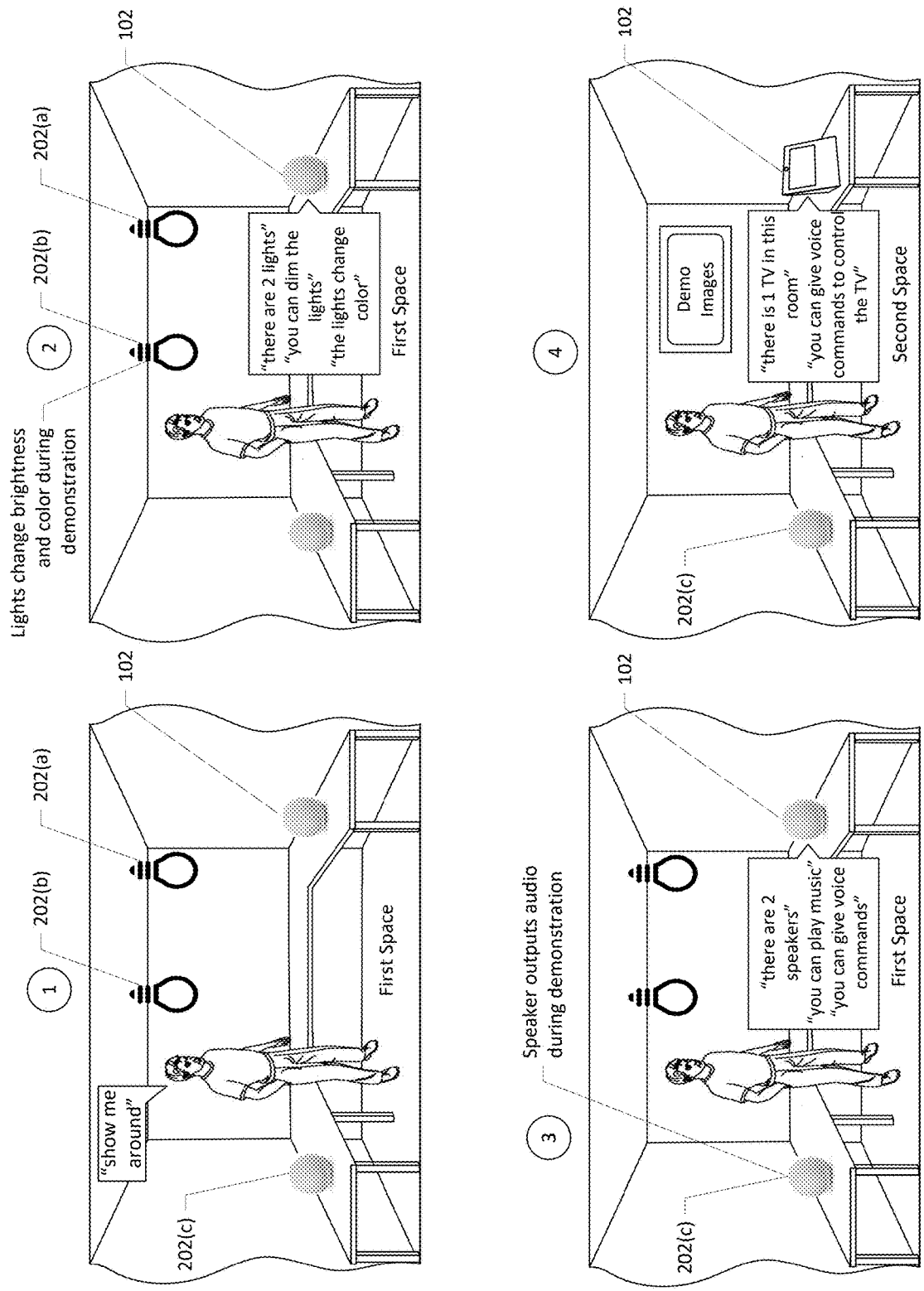
FIG. 2 illustrates a schematic diagram of example environments where dynamic smart device demonstration may be performed.

FIG. 2 illustrates a schematic diagram of example environments where dynamic smart device demonstration is being performed. FIG. 2 may include some of the same or similar components as described with respect to FIG. 1. For example, FIG. 2 may include a voice interface device 102. Additionally, the environments depicted in FIG. 2 may include one or more smart devices 202(a)-(b). These smart devices 202(a)-(b) may be the same or similar and may perform the same or similar functions as the smart devices 103(a)-(c) as described with respect to FIG. 1. Additionally, as shown in FIG. 2, more than one voice interface device 102 may be disposed in a given environment, and that voice interface device may be one of the smart devices 202(c) in the environment. As shown in FIG. 2, changes to actions performed by the various devices occur during a smart device demonstration. Those changes are depicted in steps 1-4. However, it should be understood that more or fewer steps may be involved in a given smart device demonstration and/or the order of the steps may vary.

To illustrate, at step 1, a user within a given space may provide user input requesting initiation of a smart device demonstration. In some examples, the user input may correspond to speech input received at a voice interface device 102. In these examples, the voice interface device 102 may capture audio representing the speech input and the voice interface device 102 and/or a speech processing system may analyze corresponding audio data to determine that the speech input corresponds to a request to initiate a smart device demonstration. In examples, the speech input may be "show me around," "demonstrate devices," and/or any other voice command evidencing an intent to initiate a smart device demonstration. Thereafter, a demonstration application configured to handle intents associated with smart device demonstrations may be called to determine what devices are to be selected for the demonstration at issue. To do so, the demonstration application may receive and utilize a device identifier associated with the voice interface device 102 that received the speech input. The device identifier may be utilized to determine associated account data for the voice interface device. The account device may include indicators of other smart devices 202(a)-(c) that are associated with the voice interface device 102, as well as, in examples, indicators of device groups that have been setup in association with the account data. For example, the account data may indicate that the voice interface device 102 is associated with two smart lights and a smart speaker. The account data may also provide naming indicators for the smart devices 202(a)-(c) and the voice interface device 102. Additionally, the account data may indicate that the voice interface device 102 is in a device group with one or more of the smart devices, including, by way of example, the two smart lights. In examples, the user that initiated the demonstration may be a guest in the environment and may not be associated with a user account. In these examples, if the devices in the environment are associated with a user account, that user account may be utilized to determine which devices are to be made a part of the demonstration. In other examples, the data utilized to determine devices groups as described herein may also be utilized to determine the devices for the demonstration even in situations where user account data is not utilized for this purpose. In these user guest examples, the owner and/or administrator of an account may have permitted guest usage and may have configured some limited access and/or use that can be environment specific, group specific, etc. These permissions may be taken into account when determining which devices to include in a demonstration.

At step 2, data representing device functionality descriptions as well as directives may be received from a system associated with the voice interface device 102. The voice interface device 102 may, in the example of FIG. 2, output audio representing the device functionality descriptions. Here those descriptions are "there are 2 lights," "you can dim the lights," and "the lights change color." While the device functionality descriptions are being output, the directives described herein may be sent to the two lights at issue to cause those lights to perform device state transitions in synchronization with output of the device functionality descriptions. For example, the lights may turn on and/or off and/or flicker when the description "there are 2 lights" is being output and/or near in time to when that description is output. Then, the lights may dim when the description "you can dim the lights" is being output. Then, the lights may change color when the description "the lights change color" is being output.

At step 3, the next portion of the smart device demonstration may occur. This portion of the demonstration may be associated with demonstrating a different device type with different functionality from the smart lights described with respect to step 2. In this example, the device functionality description output by the voice interface device 102 is "there are 2 speakers," "you can play music," and "you can give voice commands." In this example, the smart device 202(c) and the voice interface device 102 are both smart speakers and thus can be demonstrated as such. While the device functionality descriptions are being output, directives may be sent to the smart device 202(c) to output audio and to the voice interface device 102 to output audio. In other examples, the smart speakers may be identified for the user such as by sending a directive to the smart speakers to illuminate a light ring, to display an image if the device has a screen, etc. In the example of step 3, the voice interface device 102 itself transitions device state as a smart device that is part of the demonstration.

At step 4, the user may be situated in a second space that differs from the first space where the user was situated for steps 1-3. In this example, a portion of the demonstration may be associated with the second space. In these examples, audio and/or other types of requests may be output requesting that the user move from the first space to the second space to resume the demonstration. The user may provide input indicating that the user has moved to the second space, and/or one or more sensors within the second space may be utilized to detect presence of the user and resume the demonstration. In examples, a light or other visual indicator and/or audio may be output on a device in the second space to notify the user of which space the user is to move to in order to resume the demonstration. As shown in FIG. 2, the second space includes a smart television and the device functionality description to be output may include "there is 1 TV in this room," "you can give voice commands to control the TV." While this description is being output, the television may be caused to demonstrate the functionality.

Figure 3:
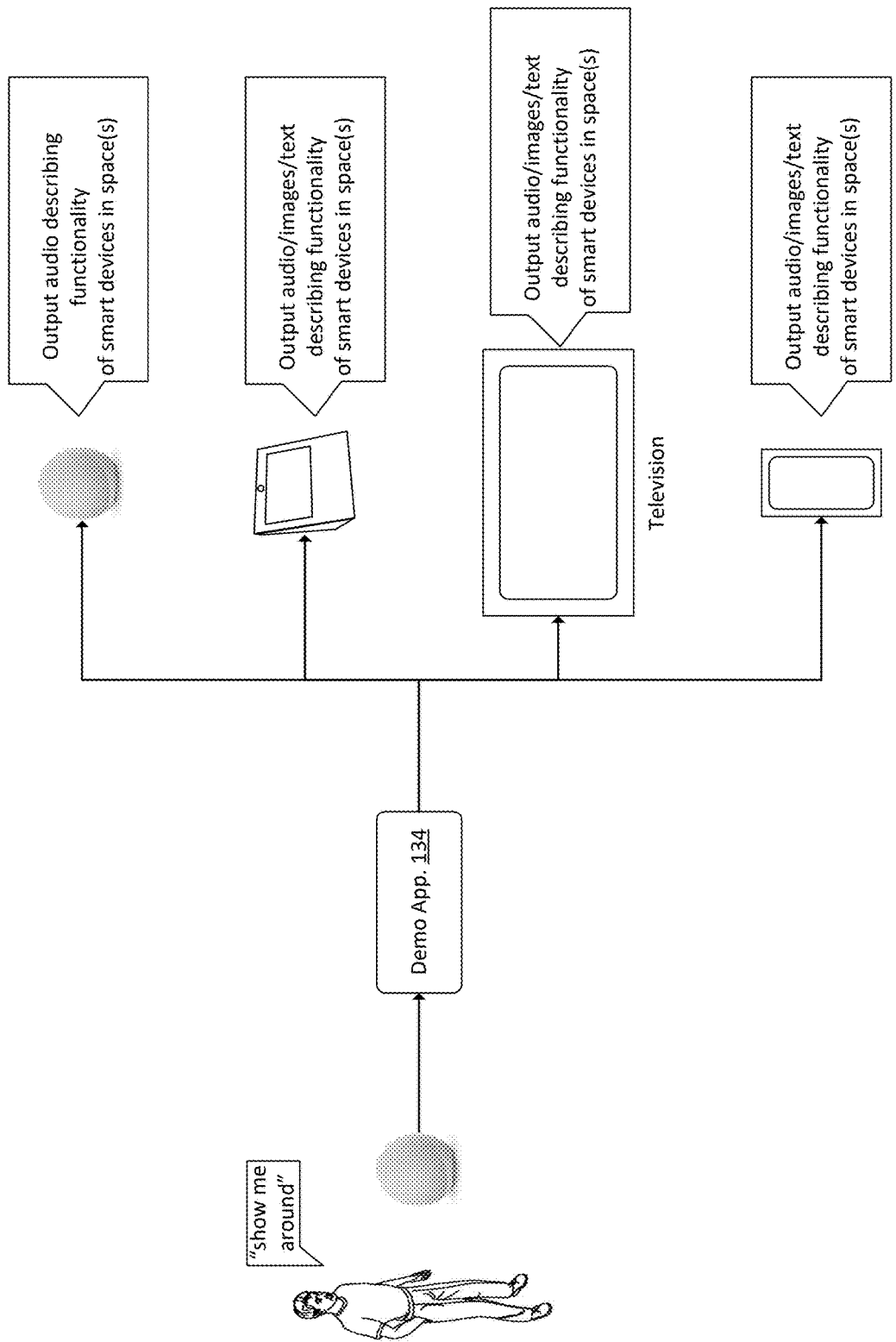
FIG. 3 illustrates a conceptual diagram of example components utilized for dynamic smart device demonstration.

FIG. 3 illustrates a conceptual diagram of example components utilized for dynamic smart device demonstration. FIG. 3 may include some of the same devices and components as those described with respect to FIG. 1. For example, FIG. 3 includes a voice interface device 102 and a demonstration component 134. These devices and components may perform the same or similar operations as described with respect to FIG. 1.

In the example of FIG. 3, a user may provide user input indicating an intent to initiate a smart device demonstration. In some examples, the user input may correspond to speech input received at a voice interface device 102. In these examples, the voice interface device 102 may capture audio representing the speech input and the voice interface device 102 and/or a speech processing system may analyze corresponding audio data to determine that the speech input corresponds to a request to initiate a smart device demonstration. In examples, the speech input may be "show me around," "demonstrate devices," and/or any other voice command evidencing an intent to initiate a smart device demonstration. Thereafter, a demonstration application 134 configured to handle intents associated with smart device demonstrations may be called to determine what devices are to be selected for the demonstration at issue. To do so, the demonstration application 134 may receive and utilize a device identifier associated with the voice interface device 102 that received the speech input. The device identifier may be utilized to determine associated account data for the voice interface device. The account device may include indicators of other smart devices that are associated with the voice interface device 102, as well as, in examples, indicators of device groups that have been setup in association with the account data. For example, the account data may indicate that the voice interface device 102 is associated with two smart lights and a smart speaker. The account data may also provide naming indicators for the smart devices and the voice interface device 102. Additionally, the account data may indicate that the voice interface device 102 is in a device group with one or more of the smart devices, including, by way of example, the two smart lights.

The demonstration application 134 may then determine which device to output device functionality descriptions as described herein. In some examples, the same voice interface device that received the user input to initiate the smart device demonstration may output audio describing the device functionality of smart devices in the one or more spaces at issue. In other examples where the device that received the user input is a multi-modal device that includes a screen, in addition to or instead of outputting audio describing the device functionality, the screen may be utilized to display text and/or images describing the device functionality. In still other examples, a device other than the voice interface device that received the user input may be caused to output the descriptions of the device functionalities during a smart device demonstration. For example, one of the smart devices in the environment may include a speaker and thus may be selected to output audio describing the device functionality. Additionally, one of the smart devices in the environment may include a screen and thus may be selected to output text and/or images describing the device functionality.

In still other examples, the voice interface device and/or the associated system may determine that a user device, such as a wearable and/or portable device associated with a given user, may be in the environment in question. For example, the user that provided the speech input requesting initiating of the smart device demonstration may have a personal cell phone, tablet, etc. with them when the request is made. In these examples, device beaconing may be utilized to identify the user device. The demonstration application 134 may utilize this data to determine whether to output audio and/or text and/or images associated with the smart device demonstration using the user device. In some examples, the demonstration application 134 may determine to utilize the user device in this manner when the user device includes a companion application associated with speech processing performed by the voice interface device. In this example, the user may have other voice interface devices and/or other smart devices and may have previously downloaded the companion application to assist in controlling the voice interface devices and/or other smart devices. In examples where the companion application is present on the user device, the demonstration application 134 may utilize this data to determine that the companion application should be utilized to output at least a portion of the device functionality descriptions for the smart device demonstration.

Figure 4:
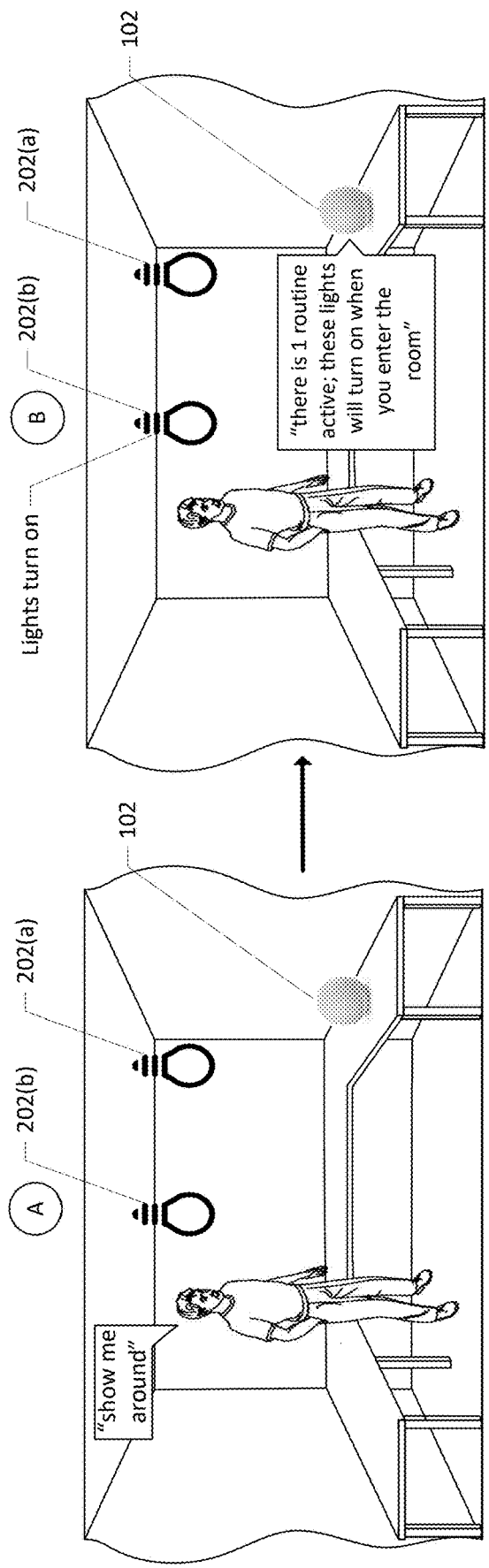
FIG. 4 illustrates a schematic diagram of an example environment where demonstration of routines is performed in association with smart device demonstrations.

FIG. 4 illustrates a schematic diagram of an example environment where demonstration of routines is performed in association with smart device demonstrations. FIG. 4 may include at least some of the same devices and components as those described with respect to FIG. 1. For example, FIG. 4 includes a voice interface device 102 and one or more smart devices 202(*a*) and 202(*b*) from FIG. 2. Additionally, FIG. 4 illustrates a progression during a smart device demonstration from step A to step B. However, it should be understood that additional or different steps may also be involved in the processes depicted with respect to FIG. 4.

To illustrate, at step A, a user within a given space may provide user input requesting initiation of a smart device demonstration. In some examples, the user input may correspond to speech input received at a voice interface device 102. In these examples, the voice interface device 102 may capture audio representing the speech input and the voice interface device 102 and/or a speech processing system may analyze corresponding audio data to determine that the speech input corresponds to a request to initiate a smart device demonstration. In examples, the speech input may be "show me around," "demonstrate devices," and/or any other voice command evidencing an intent to initiate a smart device demonstration. Thereafter, a demonstration application configured to handle intents associated with smart device demonstrations may be called to determine what devices are to be selected for the demonstration at issue. To do so, the demonstration application may receive and utilize a device identifier associated with the voice interface device 102 that received the speech input. The device identifier may be utilized to determine associated account data for the voice interface device. The account device may include indicators of other smart devices 202(*a*)-(*b*) that are associated with the voice interface device 102, as well as, in examples, indicators of device groups that have been setup in association with the account data. For example, the account data may indicate that the voice interface device 102 is associated with two smart lights and a smart speaker. The account data may also provide naming indicators for the smart devices 202(*a*)-(*b*) and the voice interface device 102. Additionally, the account data may indicate that the voice interface device 102 is in a device group with one or more of the smart devices, including, by way of example, the two smart lights.

In the example of FIG. 4, in addition to demonstrating the capabilities of the smart devices at issue, such as how device state transitioned occur, the smart device demonstration may also include a demonstration of routines that the smart device has been configured to perform. Routines may be any set of rules or similar conditions that cause one or more smart devices to perform an action when a condition is met. A simple example of a routine is when user presence is detected in a given environment a smart light is caused to turn on. Other routines may be associated with conditions such as a time of day, day of week, detection of a given user, detection of environmental conditions such as certain weather, temperatures, etc., detection of certain noises such as a person falling, etc. Any or all of the smart devices described herein may also be associated with a given routine. In examples, these routines may be setup by a user. In other examples, the routines may be inferred from prior user interactions. In any or all of these examples, the user that initiated the smart device demonstration may not be aware of the routines that have been setup for the devices at issue. As such, the demonstration may include, at least in part, a demonstration of the routines that are active.

As shown in FIG. 4, a description of the routine may be output by one or more of the devices, such as the voice interface device 102. An example description as shown in FIG. 4 is "there is 1 routine active; these lights will turn on when you enter the room." When this routine description is output, a directive may be sent to the lights in question to cause them to activate, flicker, etc. Additional routines may also be demonstrated, particularly when requested by a user. In some examples, one or more routines may be personal or otherwise would not be applicable to the user requesting the smart device demonstration. In these examples, the demonstration application 134 may utilize user input and/or any of the data described herein to determine whether a given routine should not be included in a smart device demonstration.

FIGS. 5-10 illustrates processes for dynamic smart device demonstration. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4 and 11-13, although the processes may be implemented in a wide variety of other environments, architectures and systems.

Figure 5:
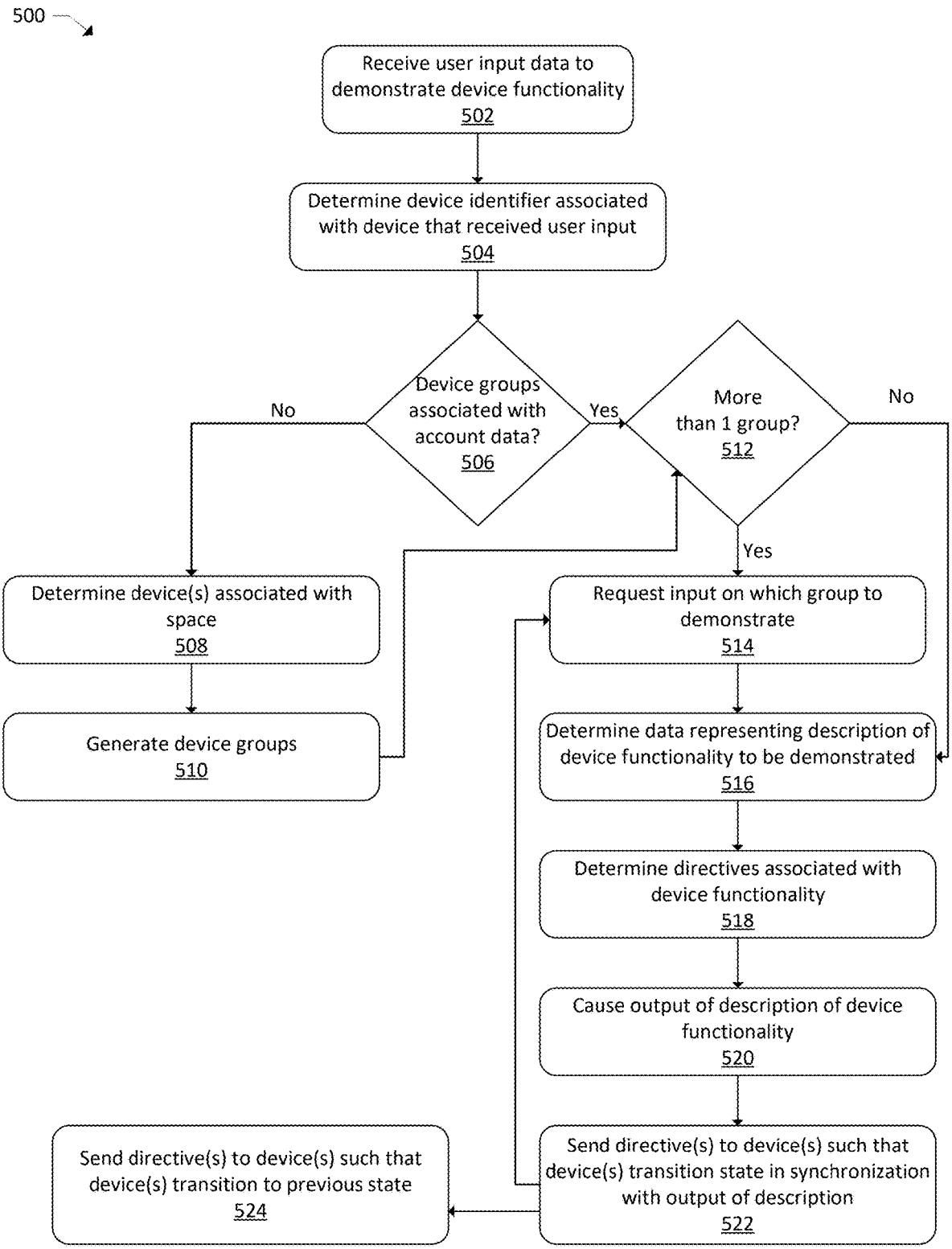

FIG. 5 illustrates a flow diagram of an example process 500 for identifying devices to perform a smart home demonstration with. The order in which the operations or steps are described is not intended to be construed as a limitation, and any number of the described operations may be combined in any order and/or in parallel to implement process 500.

At block 502, the process 500 may include receiving user input data to demonstrate device functionality. In some examples, the user input may correspond to speech input received at a voice interface device. In these examples, the voice interface device may capture audio representing the speech input and the voice interface device and/or a speech processing system may analyze corresponding audio data to determine that the speech input corresponds to a request to initiate a smart device demonstration. In examples, the speech input may be "show me around," "demonstrate devices," and/or any other voice command evidencing an intent to initiate a smart device demonstration. Thereafter, a demonstration application configured to handle intents associated with smart device demonstrations may be called to determine what devices are to be selected for the demonstration at issue.

At block 504, the process 500 may include determining a device identifier associated with the device that received the user input. For example, the demonstration application may receive and utilize a device identifier associated with the voice interface device that received the speech input. The device identifier may be utilized to determine associated account data for the voice interface device. The account device may include indicators of other smart devices that are associated with the voice interface device, as well as, in examples, indicators of device groups that have been setup in association with the account data. For example, the account data may indicate that the voice interface device is associated with two smart lights and a smart speaker. The account data may also provide naming indicators for the smart devices and the voice interface device. Additionally, the account data may indicate that the voice interface device is in a device group with one or more of the smart devices, including, by way of example, the two smart lights. In other examples, instead of utilizing a device identifier, contextual data associated with the environment in which the voice interface device is situated may be utilized to determine the account data at issue and/or to determine what devices are proximate to the voice interface device when the demonstration request is received. This contextual data may include any data described herein for determining device groups, for example.

At block 506, the process 600 may include determining whether device groups are associated with the account data at issue. For example, when smart devices are setup for use and/or at some point thereafter a user may create a device group such as "living room lights" and indicate which devices are associated with such a group. In other examples, device groups may have been generated by the systems described herein, with or without user input.

In examples where at least one device group is not associated with the account data at issue, the process 500 may include, at block 508, determining one or more devices associated with the space at issue. For example, the demonstration application may infer device groups based at least in part on data available to the demonstration application. Such data may include, for example, RSSI values indicating signal strength as between various devices, naming indicators of devices indicating which devices have similar and different names, device affinity data indicating how frequently a given voice interface device has been utilized to control various smart devices, device communication data indicating which devices are in shortrange communication with each other, such as via a Bluetooth® and/or other shortrange communication protocol, etc.

At block 510, the process 500 may include generating one or more device groups. For example, the demonstration application may be configured to determine which smart devices are associated with a given space and may, at least for the purpose of performing the smart device demonstration, generate a device group that includes the smart devices in the space.

In examples where at least one device group is associated with the account data and/or after generation of the one or more device groups at block 510, the process 500 may include, at block 512, determining whether more than one group is associated with the account data and/or has been generated. For example, the demonstration application may determine whether the account data indicates that one or more than one device group has been setup and/or the demonstration application may determine whether zero, one, or more than one device group has been generated for the purpose of smart device demonstration.

In examples where more than one device group is present, the process 500 may include, at block 514, requesting input on which group to demonstrate. For example, to ease in making the smart device demonstration a positive user experience, the system may indicate which device groups are available for demonstration and may query the user for identification of which of the device groups to demonstrate. Once a selected device group is demonstrated, the system may query the user for additional user input indicating whether another of the device groups should be demonstrated. In examples, querying the user for which group to demonstrate may be based at least in part on the environment where the user and/or a user device associated with the user is situated, most commonly used groups, prior device usage by the user, etc. As described in more detail herein, the generation of groups and recommendation of which groups to surface for a demonstration may be based at least in part on functionality types of the devices in the groups and shared functionalities among devices, such as a group of lights, a group of speakers, or a group that include multiple different device types.

In examples where only one device group is present and/or after receiving the input on which group to demonstrate, the process 500 may include, at block 516, determining data representing a description of device functionality to be demonstrated. For example, a demonstration database may be queried for data to be utilized to perform the demonstration. This data may include audio data, text data, and/or image data representing a description of the device(s) and/or functionalities to be demonstrated. For example, if functionality of a smart device is to be demonstrated, the data may include a description such as "this group includes one smart light; you can ask me to turn the light on and off, to dim the light, or to change the light's color." Similar functionality descriptions for other device types may have been previously generated and stored in the demonstration database for retrieval. As such, the device type(s) of the device(s) at issue as well as the functionalities may be utilized to determine which data to query from the demonstration database. Additionally, in examples, the descriptions may be customized for a given demonstration. For example, the specific group name may be inserted into the description, such as "there are two lights in this living room group." In other examples, at least a portion of the functionality descriptions may be generated on the fly in response to receiving the request to initiate the smart device demonstration. In examples where the description is to be output audibly, a TTS component may be configured to generate the audio data of the description to be utilized to output corresponding audio to the user. In other examples, the data queried from the demonstration database may be text data and/or image data configured to be displayed on one or more devices. For example, the voice interface device that received the request to initiate the smart device demonstration may be a multi-modal device that includes a screen. In this example, the functionality description(s) may be presented as text and/or an image on the screen in addition to, or instead of, output of an audible version of the description. In still other examples, the text and/or images associated with the functionality description(s) may be output on another device in the environment other than the voice interface device that received the request. For example, one of the smart devices may display the functionality description(s) and/or a user device associated with the user in question (such as a personal phone) may display the functionality description(s).

At block 518, the process 500 may include determining one or more directives associated with the device functionality to be demonstrated. For example, a directive generator may be configured to generate one or more directives configured to cause device state transitions to be performed by the smart devices while the functionality descriptions are output. Just by way of example, the directives may be configured to cause device state transitions such as turning a device on or off, adjusting light brightness, adjusting light color, adjusting temperature settings, operation of a smart television, operation of a smart appliance, operation of a smart speaker, operation of smart window treatments, and/or any other operations that may be performed by a smart device of any kind. The demonstration application may request generation of the relevant directives based at least in part on the selected functionality descriptions.

At block 520, the process 500 may include causing output of the description of the device functionality. For example, the demonstration application may be configured to send the data representing the functionality description(s) and the directive(s) to the voice interface device and/or one or more of the smart devices. In addition, the demonstration application may also send data to be utilized by the voice interface device and/or one or more of the smart devices to synchronize output of the functionality description(s) with device state transitions caused by the directive(s).

At block 522, the process 500 may include sending the one or more directives to the one or more devices associated with the demonstration such that the devices transition state in synchronization with output of the descriptions. For example, when functionality descriptions for a smart light are output such as "there are two lights," the directives may be sent to the two smart lights to cause those smart lights to turn on and/or off as a visual identifier of which lights are the smart lights. The demonstration may continue with, "you can dim . . . or brighten the lights." When this portion of the demonstration is occurring, directives may be sent to the two smart lights to first dim the lights when "you can dim" is output, and then to brighten the lights when "or brighten the lights" is output. By so doing, use of the described functionality may be demonstrated while the functionality description is being output.

The demonstration process may continue until all groups are described and/or until the user opts out of continued demonstration of the smart devices.

At block 524, the process 500 may include sending directives to the devices in question to cause those devices to transition back to the states they were in prior to the demonstration. To do so, the system may generate data indicating a device state at a time when the user input data corresponding to the request for the demonstration is received. Then, when the demonstration has concluded, at least for the portion of the demonstration associated with the device state transition at issue, the data may be queried to determine what the device state of the device at issue was prior to the demonstration. A directive may then be sent to the device to transition back to the queried device state.

Figure 6:
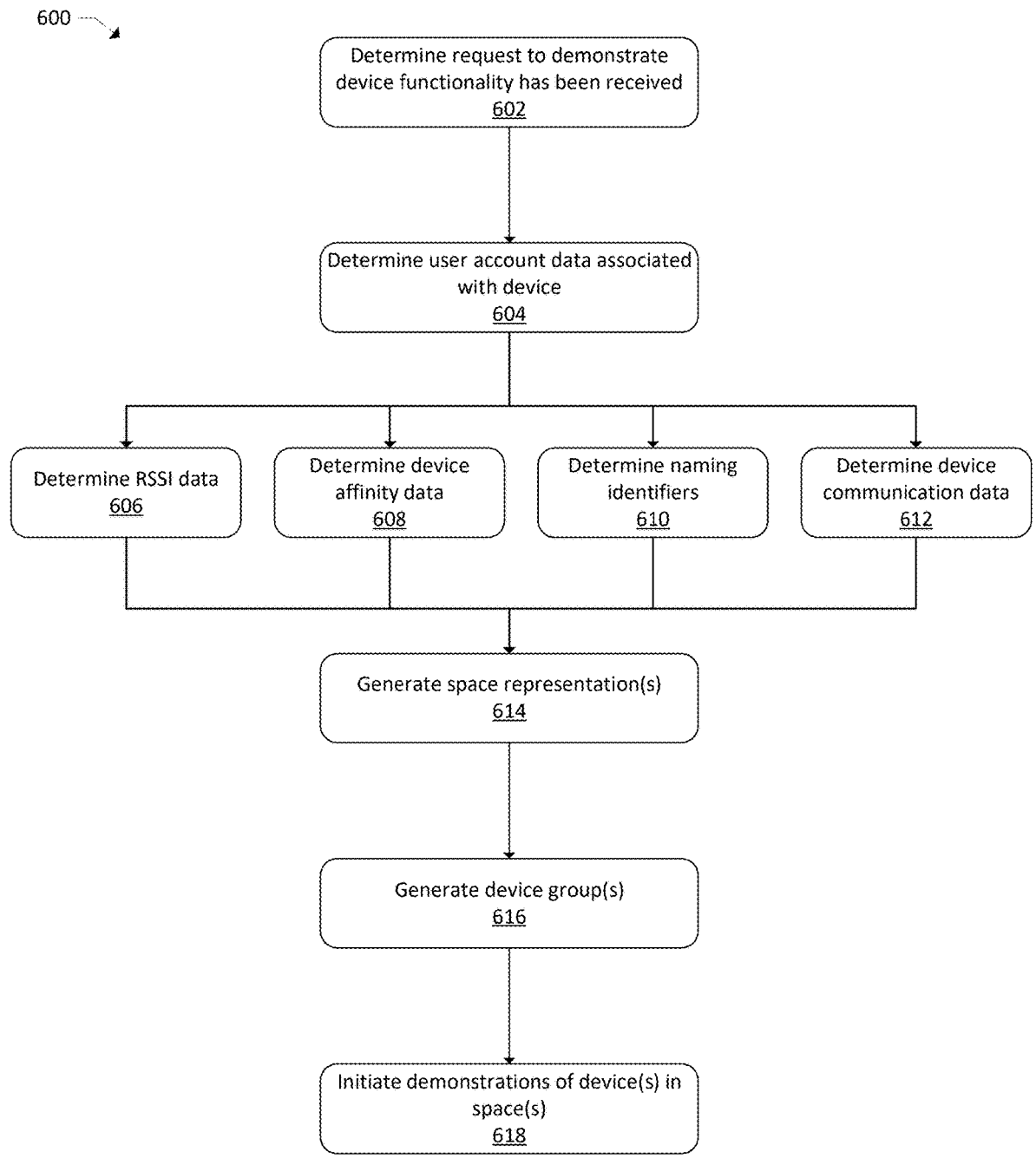
FIG. 6 illustrates a flow diagram of an example process for identifying groups of devices for dynamic smart device demonstration.

FIG. 6 illustrates a flow diagram of an example process for identifying groups of devices for dynamic smart device demonstration. The order in which the operations or steps are described is not intended to be construed as a limitation, and any number of the described operations may be combined in any order and/or in parallel to implement process 600.

At block 602, the process 600 may include determining a request to demonstrate device functionality has been received. In some examples, the user input may correspond to speech input received at a voice interface device. In these examples, the voice interface device may capture audio representing the speech input and the voice interface device and/or a speech processing system may analyze corresponding audio data to determine that the speech input corresponds to a request to initiate a smart device demonstration. In examples, the speech input may be "show me around," "demonstrate devices," and/or any other voice command evidencing an intent to initiate a smart device demonstration. Thereafter, a demonstration application configured to handle intents associated with smart device demonstrations may be called to determine what devices are to be selected for the demonstration at issue.

At block 604, the process 600 may include determining user account data associated with the device that received the request to demonstration the device functionality. For example, the demonstration application may receive and utilize a device identifier associated with the voice interface device that received the speech input. The device identifier may be utilized to determine associated account data for the voice interface device. The account data may include indicators of other smart devices that are associated with the voice interface device, as well as, in examples, indicators of device groups that have been setup in association with the account data. For example, the account data may indicate that the voice interface device is associated with two smart lights and a smart speaker. The account data may also provide naming indicators for the smart devices and the voice interface device. Additionally, the account data may indicate that the voice interface device is in a device group with one or more of the smart devices, including, by way of example, the two smart lights. In other examples, instead of utilizing a device identifier, contextual data associated with the environment in which the voice interface device is situated may be utilized to determine the account data at issue and/or to determine what devices are proximate to the voice interface device when the demonstration request is received. This contextual data may include any data described herein for determining device groups, for example. When account data is utilized as described herein, that account data may include a home graph that indicates relationships between devices associated with the account data. In this instance, the home graph may be parsed to determine device groups and other information for performing a demonstration. This information may be controlled or otherwise limited by the account owner in various ways that may limit how demonstrations are performed.

At block 606, the process 600 may include determining RSSI data. For example, the account data may include and/or one or more of the devices in the environment may be queried for RSSI data indicating signal strengths as between various devices in the environment. The signal strength may indicate that signals sent between certain devices are stronger and/or have less noise than signal sent between other devices. This signal strength may be a strong indicator of how close devices are to each other as well as whether objects such as walls, doors, etc. are positioned between the devices. This RSSI data may be utilized to indicate which devices are located in the same room as each other.

At block 608, the process 600 may include determining device affinity data. For example, the device affinity data may indicate how frequently a given device, such as a voice interface device, is utilized to control one or more smart devices. For example, a first voice interface device located in a bedroom may be utilized 98% of the time when a voice command to operate "bedroom lights" is received and only 2% of the time with respect to another voice interface device located in a kitchen. The kitchen voice interface device, however, may be utilized to operate "kitchen lights" and "porch lights" more frequently than the bedroom voice interface device utilized to operate such devices. This device affinity data may indicate groupings of devices most frequently controlled by various voice interface devices.

At block 610, the process 600 may include determining naming identifiers of devices associated with the account data. For example, a user and/or system associated with the smart devices may provide naming indicators for smart devices and these naming indicators may be stored in the account data in association with the devices to which they correspond.

At block 612, the process 600 may include determining device communication data. For example, when a mobile device moves into proximity to one or more of the voice interface devices and/or the smart devices, those devices may detect the mobile device via device beaconing and/or utilizing one or more shortrange communication protocols such as Bluetooth®.

At block 614, the process 600 may include generating space representations associated with an environment in which the device that received the request is situated. For example, the demonstration application described herein may utilize some or all of the RSSI data, the device affinity data, the naming indicators, the device communication data, and/or other data determined to be relevant for determining which devices are located in a given space to determine the set of devices located in a space where the user provided the request for smart device demonstration. This data may include output from one or more trained machine learning models, as described with respect to FIG. 1.

At block 616, the process 600 may include generating one or more device groups associated with the spaces. For example, the demonstration application may be configured to determine which smart devices are associated with a given space and may, at least for the purpose of performing the smart device demonstration, generate a device group that includes the smart devices in the space.

At block 618, the process 600 may include initiating demonstrations of one or more devices in the one or more spaces. For example, device functionality descriptions may be obtained and smart device directives may be generated. Data representing the descriptions as well as the directives may be sent to the devices in question to cause output of the device functionality descriptions in synchronization with state transitioned performed utilizing the directives.

Figure 7:
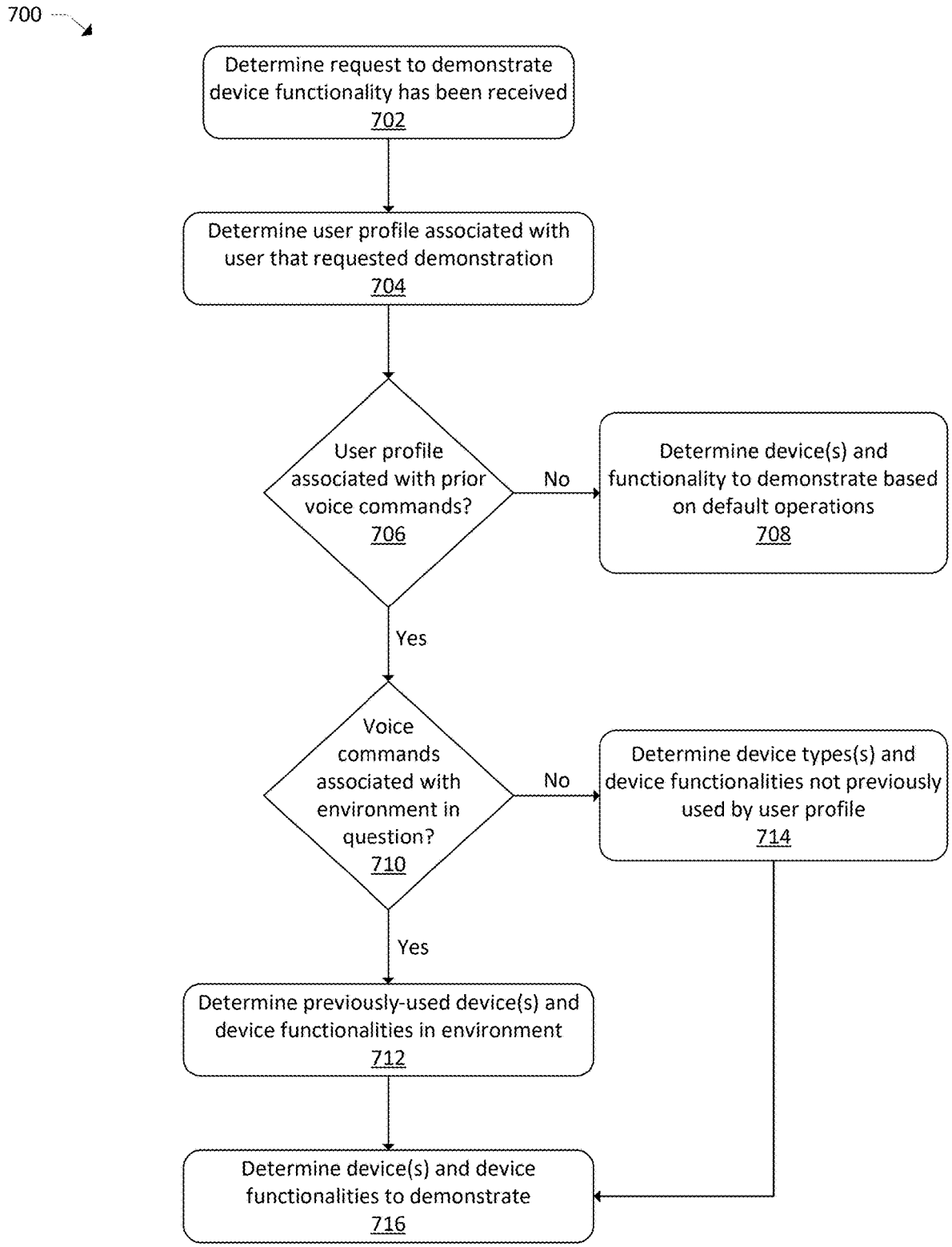
FIG. 7 illustrates a flow diagram of an example process for performing voice recognition on a voice command to determine a user profile associated with a smart device demonstration.

FIG. 7 illustrates a flow diagram of an example process for performing voice recognition on a voice command to determine a user profile associated with a smart device demonstration. The order in which the operations or steps are described is not intended to be construed as a limitation, and any number of the described operations may be combined in any order and/or in parallel to implement process 700.

At block 702, the process 700 may include determining a request to demonstrate device functionality has been received. In some examples, the user input may correspond to speech input received at a voice interface device. In these examples, the voice interface device may capture audio representing the speech input and the voice interface device and/or a speech processing system may analyze corresponding audio data to determine that the speech input corresponds to a request to initiate a smart device demonstration. In examples, the speech input may be "show me around," "demonstrate devices," and/or any other voice command evidencing an intent to initiate a smart device demonstration. Thereafter, a demonstration application configured to handle intents associated with smart device demonstrations may be called to determine what devices are to be selected for the demonstration at issue.

At block 704, the process 700 may include determining a user profile associated with a user that requested the demonstration. For example, a voice recognition component may be configured to identify a speaker of the request to initiate a smart device demonstration. For example, when a user provides speech input requesting a demonstration, audio data representing the speech input may be generated and attributes of the audio data may be compared to stored voice signatures associated with user profiles known to the speech processing system. This comparison may be utilized to identify the user profile that corresponds to the attributes of the audio data. In examples, the device identifier in question may be looked up to determine a user profile associated with the device identifier. The account data may be separate from other information such as premise data or similar data structures that are associated with the device in question but may not necessarily be associated with the account data at issue.

At block 706, the process 700 may include determining whether the user profile is associated with prior voice commands to operate smart devices. For example, once a user profile has been identified, prior user interactions associated with the user profile may be utilized to customize a smart device demonstration. For example, the prior user interactions may indicate that the user in question has already requested use of one or more of the smart devices and/or one or more of the functionalities in the environment. This data may be utilized to determine that these previously-used devices and/or functionalities should not be included in the smart device demonstration. Other data from the user profile, including a degree of smart device usage in general, a length of time that the user profile has been active, a number of device and/or device types associated with the user profile, etc. may be utilized to determine how to customize a given smart device demonstration for that user.

In examples where the user profile is not associated with such prior voice commands, the process 700 may include, at block 708, determining one or more devices and functionality to demonstrate based on one or more default operations, including operations described with respect to FIG. 5. For example, device groups may be identified and may be demonstrated based on user input indicating selection of given groups.

In examples where the user profile is associated with prior voice commands, the process 700 may include, at block 710, determining whether the prior voice commands are associated with the environment in question. For example, in some situations a given user may have not provided voice commands in association with the speech processing system in question and/or may have provided only very few voice commands. In other situations, a user may have provided a good deal of voice commands. In this example, the voice commands may have been to operate smart devices in the environment in question, while in other situations none of the voice commands may have been to operate smart devices in the environment in question.

In examples where the prior voice commands are associated with the environment in question, the process 700 may include, at block 712, determining previously-used devices associated with the prior voice commands and device functionality previously used. This data may be utilized to determine that these previously-used devices and/or functionalities should not be included in the smart device demonstration.

In examples where the prior voice commands are not associated with the environment in question, the process 700 may include, at block 714, determining device types and device functionalities not previously used by the user profile. In this example, a given user may typically provide voice commands to operate smart lights, but maybe not to dim those lights or change light color. In other examples, the environment in question may have a smart device with a device type that has not been operated by the user in question.

At block 716, the process 700 may include determining the devices and functionalities to demonstrate based at least in part on the results from block 712 or block 714. For example, devices and/or functionalities that the user has already interacted with the environment may be excluded from the demonstration and/or may be ranked less favorably than other devices and/or functionalities. Also, device types and/or functionalities that the user has not interacted with even outside the environment in question may be ranked more favorably for purposes of presenting devices to demonstration the functionality of.

Figure 8:
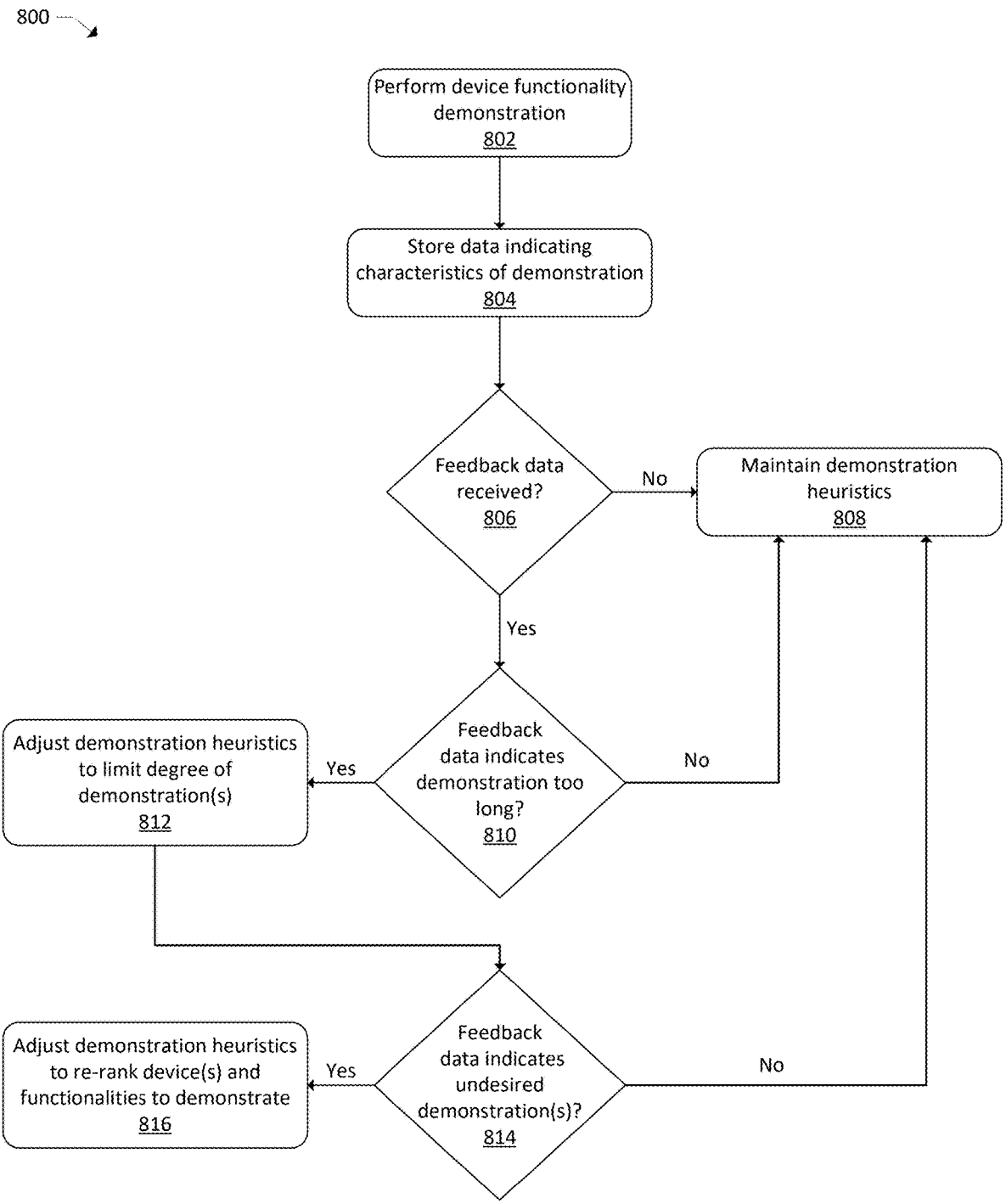
FIG. 8 illustrates a flow diagram of an example process for utilizing feedback data to improve dynamic smart device demonstrations.

FIG. 8 illustrates a flow diagram of an example process for utilizing feedback data to improve dynamic smart device demonstrations. The order in which the operations or steps are described is not intended to be construed as a limitation, and any number of the described operations may be combined in any order and/or in parallel to implement process 800.

At block 802, the process 800 may include performing a device functionality demonstration. For example, device functionality descriptions may be obtained and smart device directives may be generated. Data representing the descriptions as well as the directives may be sent to the devices in question to cause output of the device functionality descriptions in synchronization with state transitioned performed utilizing the directives.

At block 804, the process 800 may include storing data indicating characteristics of the demonstration. For example, indicators of the devices that were demonstrated, the device types, the device functionalities, the routines, device groups, user profiles, user input during the demonstration, and/or any other data associated with the demonstration may be stored.

At block 806, the process 800 may include determining whether feedback data has been received. For example, a feedback component may be configured to receive and utilize feedback data indicating positive and negative user interactions with smart device demonstrations. This feedback data may be generated from explicit user interactions such as a user providing input in response to a request for input on a given demonstration and/or when a user expresses frustration or otherwise a negative interaction with the demonstration such as the user saying, "stop this demonstration." In other examples, the feedback data may be generated from implicit user interactions, such as a user ceasing dialog with the voice interface device during the demonstration (e.g., "would you like to see a demonstration of the next group?" and then the user does not respond). In these and other examples, the feedback data may be generated and may be utilized to determine what device types, device functionalities, and/or device groups to subsequently demonstrate and/or how to order or otherwise rank these demonstrations.

In examples where feedback data has not been received, the process 800 may include, at block 808, maintaining demonstration heuristics associated with device and/or functionality selection. In this example, feedback data cannot be utilized to determine whether the demonstration was desirable to the user and thus the heuristics for selecting devices and functionality to include in a smart device demonstration may be maintained.

In examples where feedback data has been received, the process 800 may include, at block 810, determining whether the feedback data indicates that prior demonstrations were too long. For example, explicit feedback data may include an indication by a user that the demonstration was too long. In other examples, implicit feedback data such as a user saying "stop" during the demonstration may be utilized to determine that the demonstration was too long.

In examples where the feedback data does not indicate that prior demonstrations were too long, the process 800 may return to block 808 where the demonstration heuristics may be maintained without change based on the feedback data.

In examples where the feedback data indicates that prior demonstrations were too long, the process 800 may include, at block 812, adjusting the demonstration heuristics to limit a degree of demonstrations provided to users. For example, the heuristics may be changed to break up given demonstrations into smaller device groups and/or into functionality groups and then to query the user for permission to proceed with other groups and/or functionalities before doing so.

At block 814, the process 800 may include determining whether the feedback data indicates undesired demonstrations. For example, in addition to demonstration length, the functionalities that were demonstrated, the number of devices demonstrated, the number of spaces demonstrated, and/or one or more of the other characteristics of a demonstration as described with respect to block 804 may be indicated by the feedback data to be a cause of a negative user experience with a given demonstration.

In examples where the feedback data does not indicate undesired demonstrations, the process 800 may return to block 808 where the demonstration heuristics may be maintained without change based on the feedback data.

In examples where the feedback data indicates undesired demonstrations, the process 800 may include, at block 816, adjusting the demonstration heuristics to re-rank one or more devices and/or functionalities to demonstrate. For example, the feedback data may indicate that certain devices and/or functionalities cause negative user experiences with smart device demonstrations, and thus those devices and/or functionalities should be deprioritized while positive feedback data for demonstration of certain other devices and/or functionalities should be utilized to prioritize those devices and/or functionalities for smart device demonstration purposes. With respect to the ranking of devices and/or functionalities, as described herein, the system may initially determine which devices and/or functionalities may be demonstrated and may rank them initially based at least in part on the data described above, including for example, prior user interactions, machine learning model output, the user utterance that requested the demonstration, etc.

Figure 9:
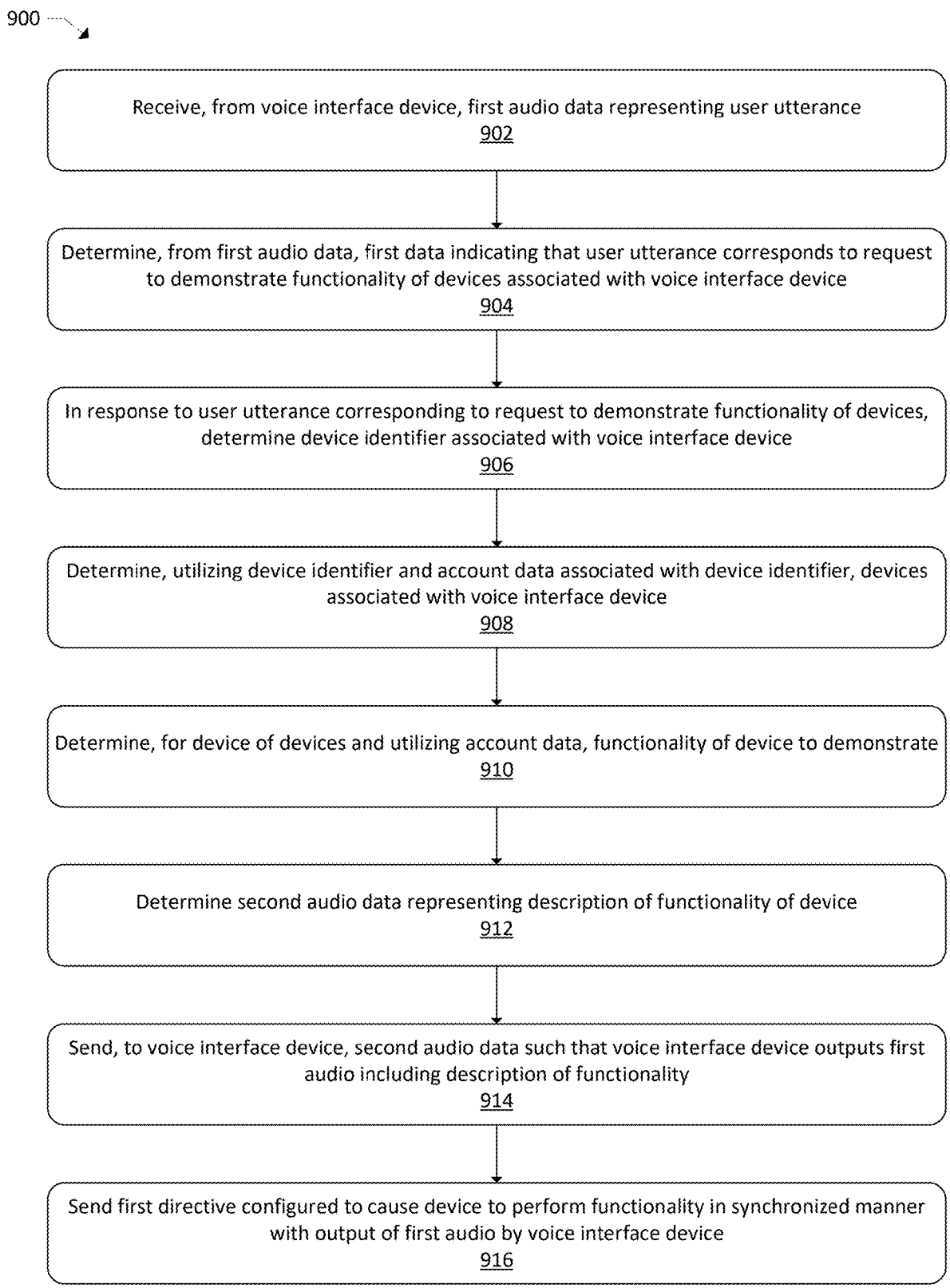
FIG. 9 illustrates a flow diagram of an example process for dynamic smart device demonstration.

FIG. 9 illustrates a flow diagram of an example process for dynamic smart device demonstration. The order in which the operations or steps are described is not intended to be construed as a limitation, and any number of the described operations may be combined in any order and/or in parallel to implement process 900.

At block 902, the process 900 may include receiving, from a voice interface device, first audio data representing a user utterance. For example, a user may provide a user utterance of "show me around" or another phrase associated with smart device demonstration. The voice interface device may generate audio data that corresponds to audio representing the user utterance and may send the audio data to a speech processing system and/or may perform at least a portion of the speech processing on the voice interface device and may send results from that processing to a speech processing system.

At block 904, the process 900 may include determining, from the first audio data, first data indicating that the user utterance corresponds to a request to demonstrate functionality of devices associated with the voice interface device. For example, ASR and/or NLU may be performed on the audio data to determine intent data corresponding to the user utterance.

At block 906, the process 900 may include, in response to the user utterance corresponding to the request to demonstrate the functionality of the devices, determining a device identifier associated with the voice interface device. For example, a demonstration application may receive and utilize a device identifier associated with the voice interface device that received the speech input. The device identifier may be utilized to determine associated account data for the voice interface device. The account device may include indicators of other smart devices that are associated with the voice interface device, as well as, in examples, indicators of device groups that have been setup in association with the account data. For example, the account data may indicate that the voice interface device is associated with two smart lights and a smart speaker. The account data may also provide naming indicators for the smart devices and the voice interface device. Additionally, the account data may indicate that the voice interface device is in a device group with one or more of the smart devices, including, by way of example, the two smart lights.

At block 908, the process 900 may include determining, utilizing the device identifier and account data associated with the device identifier, the devices associated with the voice interface device. For examples, the account data may indicate other voice interface devices and/or smart devices that are associated with the voice interface device that received the request to initiate smart device demonstration.

At block 910, the process 900 may include determining, for a device of the devices and utilizing the account data, a functionality of the device to demonstrate. For example, as described in more detail herein, once devices and/or device groups are determined for inclusion in a given smart device demonstration, functionality of the devices may also be determine for inclusion in the smart device demonstration. In these examples, the demonstration application may determine whether the number of functionalities satisfies a threshold number of functionalities and thus are few enough to all be demonstrated in a relatively short period of time. For example, even though a smart light may be configured to turn on and off, adjust brightness, and adjust color, these three functionalities can be demonstrated relevantly quickly, such as in a manner of a few seconds. However, a smart television may have comparatively many more functionalities, such as turning on and off, changing what could be hundreds of channels, adjusting volume, adjusting brightness, adjusting picture modes, switching inputs, switching displayed applications, downloading content, etc. In this example, the demonstration application may determine functionalities to select for the demonstration at issue based at least in part on feedback from prior demonstrations, anticipated amount of time to demonstrate each functionality, number of device types to be demonstrated, number of groups associated with an environment, and/or any other data that may evidence likelihood that the demonstration will be performed to the satisfaction of the user.

At block 912, the process 900 may include determining second audio data representing a description of the functionality of the device. For example, a demonstration database may be queried for data to be utilized to perform the demonstration. This data may include audio data, text data, and/or image data representing a description of the device(s) and/or functionalities to be demonstrated. For example, if functionality of a smart device is to be demonstrated, the data may include a description such as "this group includes one smart light; you can ask me to turn the light on and off, to dim the light, or to change the light's color." Similar functionality descriptions for other device types may have been previously generated and stored in the demonstration database for retrieval. As such, the device type(s) of the device(s) at issue as well as the functionalities may be utilized to determine which data to query from the demonstration database. Additionally, in examples, the descriptions may be customized for a given demonstration. For example, the specific group name may be inserted into the description, such as "there are two lights in this living room group." In other examples, at least a portion of the functionality descriptions may be generated on the fly in response to receiving the request to initiate the smart device demonstration. In examples where the description is to be output audibly, a TTS component may be configured to generate the audio data of the description to be utilized to output corresponding audio to the user. In other examples, the data queried from the demonstration database may be text data and/or image data configured to be displayed on one or more devices. For example, the voice interface device that received the request to initiate the smart device demonstration may be a multi-modal device that includes a screen. In this example, the functionality description(s) may be presented as text and/or an image on the screen in addition to, or instead of, output of an audible version of the description. In still other examples, the text and/or images associated with the functionality description(s) may be output on another device in the environment other than the voice interface device that received the request. For example, one of the smart devices may display the functionality description(s) and/or a user device associated with the user in question (such as a personal phone) may display the functionality description(s).

At block 914, the process 900 may include sending, to the voice interface device, the second audio data such that the voice interface device outputs first audio including the description of the functionality. The second audio data may be received at the voice interface device, which may utilize the second audio data to output the description.

At block 916, the process 900 may include sending a first directive configured to cause the device to perform the functionality in a synchronized manner with output of the first audio by the voice interface device. For example, a directive generator may be configured to generate one or more directives configured to cause device state transitions to be performed by the smart devices while the functionality descriptions are output. Just by way of example, the directives may be configured to cause device state transitions such as turning a device on or off, adjusting light brightness, adjusting light color, adjusting temperature settings, operation of a smart television, operation of a smart appliance, operation of a smart speaker, operation of smart window treatments, and/or any other operations that may be performed by a smart device of any kind. The demonstration application may request generation of the relevant directives based at least in part on the selected functionality descriptions. By way of example, when functionality descriptions for a smart light are output such as "there are two lights," the directives may be sent to the two smart lights to cause those smart lights to turn on and/or off as a visual identifier of which lights are the smart lights. The demonstration may continue with, "you can dim . . . or brighten the lights." When this portion of the demonstration is occurring, directives may be sent to the two smart lights to first dim the lights when "you can dim" is output, and then to brighten the lights when "or brighten the lights" is output. By so doing, use of the described functionality may be demonstrated while the functionality description is being output.

Additionally, or alternatively, the process 900 may include determining, from the account data, a first device group that includes the voice interface device and a second device group with a portion of the devices other than the voice interface device. The process 900 may also include causing the voice interface device to output second audio requesting user input for demonstrating functionality associated with the first device group or the second device group. The process 900 may also include receiving user input data indicating selection of the first device group, the first device group including the device. In these examples, sending the second audio data and sending the directive may be in response to the user input data indicating the selection of the first device group.

Additionally, or alternatively, the process 900 may include determining, from the account data, a device routine associated with at least a portion of the devices. The process 900 may also include determining, for the device routine, third audio data representing a description of the device routine. The process 900 may also include sending, to the voice interface device, the third audio data such that the voice interface device outputs second audio corresponding to the third audio data. The process 900 may also include sending, to the voice interface device, a second directive configured to cause the at least the portion of the devices to transition device states in a manner that corresponds to device state transitions performed when the device routine is performed.

Additionally, or alternatively, the process 900 may include determining, utilizing speaker recognition processing, a user profile associated with a user that provided the user utterance. The process 900 may also include determining, from the user profile, prior voice commands received at the voice interface device in association with the user profile. The process 900 may also include determining, from the prior voice commands, the functionality of the device has yet to be utilized in association with the user profile. The process 900 may also include selecting the functionality from multiple functionalities of the device to demonstrate in response to determining the functionality of the device has yet to be utilized in association with the user profile.

Figure 10:
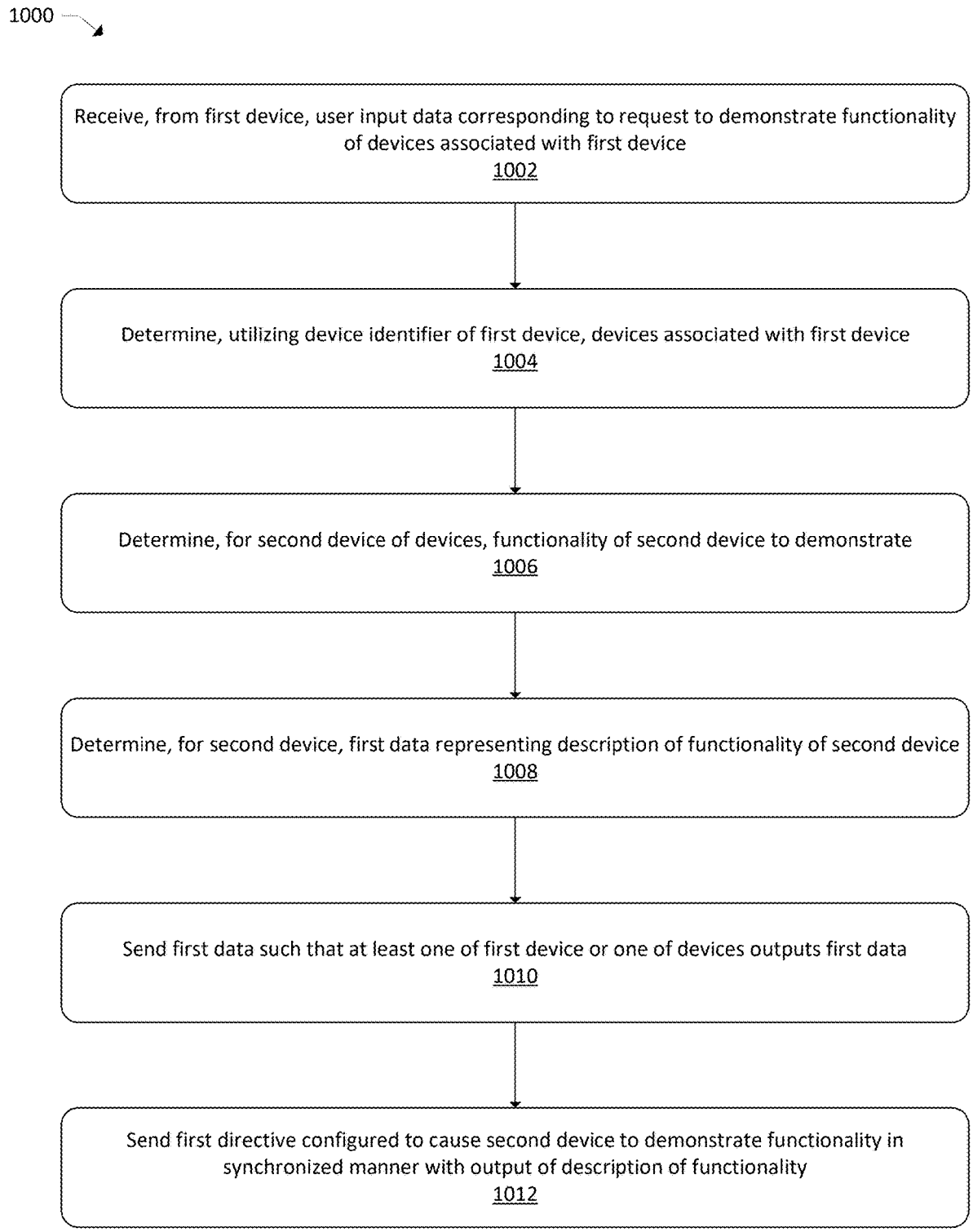
FIG. 10 illustrates a flow diagram of another example process for dynamic smart device demonstration.

FIG. 10 illustrates a flow diagram of another example process for dynamic smart device demonstration. The order in which the operations or steps are described is not intended to be construed as a limitation, and any number of the described operations may be combined in any order and/or in parallel to implement process 1000.

At block 1002, the process 1000 may include receiving, from a first device, user input data corresponding to a request to demonstrate functionality of devices associated with the first device. In some examples, the user input may correspond to speech input received at a voice interface device. In these examples, the voice interface device may capture audio representing the speech input and the voice interface device and/or a speech processing system may analyze corresponding audio data to determine that the speech input corresponds to a request to initiate a smart device demonstration. In examples, the speech input may be "show me around," "demonstrate devices," and/or any other voice command evidencing an intent to initiate a smart device demonstration. Thereafter, a demonstration application configured to handle intents associated with smart device demonstrations may be called to determine what devices are to be selected for the demonstration at issue.

At block 1004, the process 1000 may include determining, utilizing device data associated with the first device, a second device. For example, a demonstration application may receive and utilize a device identifier associated with the voice interface device that received the speech input. The device identifier may be utilized to determine associated account data for the voice interface device. The account device may include indicators of other smart devices that are associated with the voice interface device, as well as, in examples, indicators of device groups that have been setup in association with the account data. For example, the account data may indicate that the voice interface device is associated with two smart lights and a smart speaker. The account data may also provide naming indicators for the smart devices and the voice interface device. Additionally, the account data may indicate that the voice interface device is in a device group with one or more of the smart devices, including, by way of example, the two smart lights. In examples, the device data described herein may include service set identifiers (SSIDs) associated with the devices that are proximate to the voice interface device in question.

At block 1006, the process 1000 may include determining, for a second device of the devices, a functionality of the second device to demonstrate. For example, as described in more detail herein, once devices and/or device groups are determined for inclusion in a given smart device demonstration, functionality of the devices may also be determine for inclusion in the smart device demonstration. In these examples, the demonstration application may determine whether the number of functionalities satisfies a threshold number of functionalities and thus are few enough to all be demonstrated in a relatively short period of time. For example, even though a smart light may be configured to turn on and off, adjust brightness, and adjust color, these three functionalities can be demonstrated relevantly quickly, such as in a manner of a few seconds. However, a smart television may have comparatively many more functionalities, such as turning on and off, changing what could be hundreds of channels, adjusting volume, adjusting brightness, adjusting picture modes, switching inputs, switching displayed applications, downloading content, etc. In this example, the demonstration application may determine functionalities to select for the demonstration at issue based at least in part on feedback from prior demonstrations, anticipated amount of time to demonstrate each functionality, number of device types to be demonstrated, number of groups associated with an environment, and/or any other data that may evidence likelihood that the demonstration will be performed to the satisfaction of the user.

At block 1008, the process 1000 may include determining, for the second device, first data representing a description of the functionality of the second device. For example, a demonstration database may be queried for data to be utilized to perform the demonstration. This data may include audio data, text data, and/or image data representing a description of the device(s) and/or functionalities to be demonstrated. For example, if functionality of a smart device is to be demonstrated, the data may include a description such as "this group includes one smart light; you can ask me to turn the light on and off, to dim the light, or to change the light's color." Similar functionality descriptions for other device types may have been previously generated and stored in the demonstration database for retrieval. As such, the device type(s) of the device(s) at issue as well as the functionalities may be utilized to determine which data to query from the demonstration database. Additionally, in examples, the descriptions may be customized for a given demonstration. For example, the specific group name may be inserted into the description, such as "there are two lights in this living room group." In other examples, at least a portion of the functionality descriptions may be generated on the fly in response to receiving the request to initiate the smart device demonstration. In examples where the description is to be output audibly, a TTS component may be configured to generate the audio data of the description to be utilized to output corresponding audio to the user. In other examples, the data queried from the demonstration database may be text data and/or image data configured to be displayed on one or more devices. For example, the voice interface device that received the request to initiate the smart device demonstration may be a multi-modal device that includes a screen. In this example, the functionality description(s) may be presented as text and/or an image on the screen in addition to, or instead of, output of an audible version of the description. In still other examples, the text and/or images associated with the functionality description(s) may be output on another device in the environment other than the voice interface device that received the request. For example, one of the smart devices may display the functionality description(s) and/or a user device associated with the user in question (such as a personal phone) may display the functionality description(s).

At block 1010, the process 1000 may include sending the first data such that at least one of the first device or one of the devices outputs the first data. The first data may be received at the voice interface device, which may utilize the first data to output the description.

At block 1012, the process 1000 may include sending a first directive configured to cause the second device to demonstrate the functionality in a synchronized manner with output of the description of the functionality. For example, a directive generator may be configured to generate one or more directives configured to cause device state transitions to be performed by the smart devices while the functionality descriptions are output. Just by way of example, the directives may be configured to cause device state transitions such as turning a device on or off, adjusting light brightness, adjusting light color, adjusting temperature settings, operation of a smart television, operation of a smart appliance, operation of a smart speaker, operation of smart window treatments, and/or any other operations that may be performed by a smart device of any kind. The demonstration application may request generation of the relevant directives based at least in part on the selected functionality descriptions. By way of example, when functionality descriptions for a smart light are output such as "there are two lights," the directives may be sent to the two smart lights to cause those smart lights to turn on and/or off as a visual identifier of which lights are the smart lights. The demonstration may continue with, "you can dim . . . or brighten the lights." When this portion of the demonstration is occurring, directives may be sent to the two smart lights to first dim the lights when "you can dim" is output, and then to brightness the lights when "or brighten the lights" is output. By so doing, use of the described functionality may be demonstrated while the functionality description is being output.

Additionally, or alternatively, the process 1000 may include determining a first device group that includes the first device and a second device group with a portion of the devices other than the first device. The process 1000 may include causing the first device to output a request to select the first device group or the second device group. The process 1000 may include receiving user input data indicating selection of the first device group, the first device group including the second device. In these examples, sending the first data and sending the directive may be based at least in part on the user input data indicating the selection of the first device group.

Additionally, or alternatively, the process 1000 may include determining a device routine associated with at least a portion of the devices. The process 1000 may also include determining, for the device routine, second data representing a description of the device routine. The process 1000 may also include sending the second data such that the first device outputs the second data. The process 1000 may also include sending a second directive configured to cause the at least the portion of the devices to transition device states in a manner that corresponds to device state transitions performed when the device routine is performed.

Additionally, or alternatively, the process 1000 may include determining, utilizing speaker recognition processing, a user profile associated with a user that provided the user input data. The process 1000 may also include determining, based at least in part on the user profile, prior device state transition requests received at the first device in association with the user profile. The process 1000 may also include determining, from the prior device state transition requests, that the functionality of the second device has yet to be utilized in association with the user profile. The process 1000 may also include selecting the functionality from multiple functionalities of the second device to demonstrate based at least in part on determining the functionality of the second device has yet to be utilized in association with the user profile.

Additionally, or alternatively, the process 1000 may include receiving feedback data associated with prior device demonstrations, the feedback data indicating device characteristics of previously demonstrated reference devices associated with user input indicated as favorable by a user. The process 1000 may also include determining that the second device includes the device characteristics. The process 1000 may also include selecting the second device to demonstrate the functionality based at least in part on the second device including the device characteristics.

Additionally, or alternatively, the process 1000 may include determining a set of the devices associated with a physical environment where the first device is situated, wherein determining the set of the devices is based at least in part on second data indicating the first device has been previously utilized at least a threshold number of times to control the set of the devices. The process 1000 may also include identifying the set of the devices as a device group and causing the first device to output a request to select the device group for performing the demonstration. The process 1000 may also include receiving user input data indicating selection of the device group, the device group including the second device. In these examples, sending the first data and sending the directive may be based at least in part on the user input data indicating the selection of the device group.

Additionally, or alternatively, the process 1000 may include generating second data indicating a device state at a time when the user input data corresponding to the request is received. The process 1000 may also include determining that the second device demonstrated the functionality utilizing the first directive. The process 1000 may also include, based at least in part on determining that the second device demonstrated the functionality and utilizing the second data, sending a second directive configured to cause the second device to transition back to the device state.

Additionally, or alternatively, the process 1000 may include determining, based at least in part on receiving the user input data, that a user device is within an environment where the first device is situated. The process 1000 may also include determining that the user device has stored thereon an application associated with the first device. The process 1000 may also include, based at least in part on the user device having the application stored thereon, sending second data to the user device, the second data configured to cause the application to display options for demonstrating the functionality. The process 1000 may also include receiving, from the user device, third data indicating a selection of the functionality to demonstrate. The process 1000 may also include selecting the second device to demonstrate the functionality based at least in part on the third data.

Additionally, or alternatively, the process 1000 may include determining, utilizing speaker recognition processing, a user profile associated with a user that provided the user input data. The process 1000 may also include determining that the user profile differs from one or more profiles associated with account data for the first device. In these examples, determining the functionality of the second device to demonstrate may be based at least in part on the user profile differing from the one or more profiles associated with the account data for the first device.

Additionally, or alternatively, the process 1000 may include determining that demonstration of a first group of devices associated with a first environment has concluded. The process 1000 may also include determining that a user has moved into a second environment associated with a second group of devices to be demonstrated. The process 1000 may also include initiating demonstration of functionality for the second group of devices based at least in part on the user having moved into the second environment.

Figure 11:
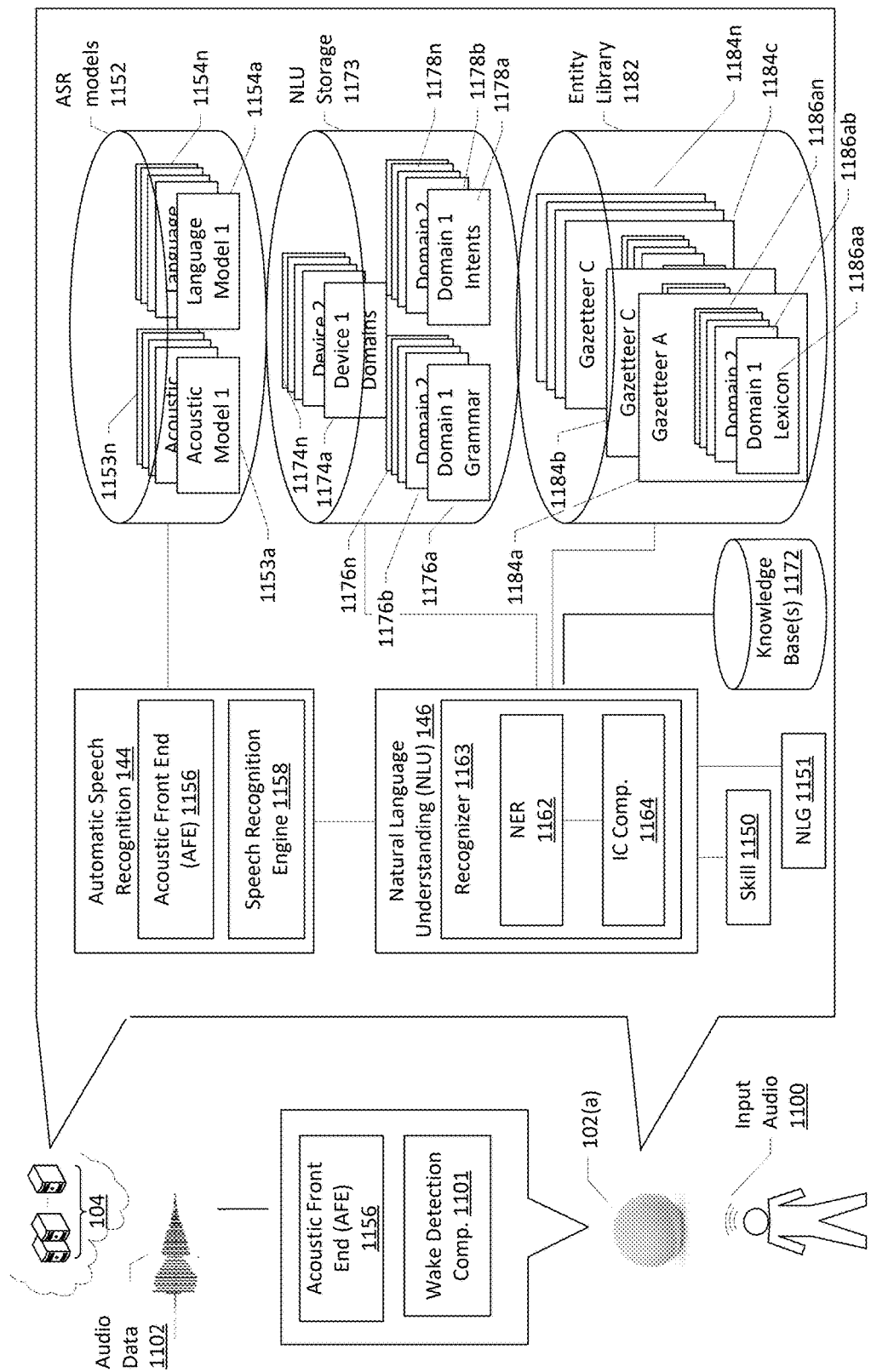
FIG. 11 illustrates a conceptual diagram of components of a speech-processing system for processing audio data provided by one or more devices.

FIG. 11 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 11 may occur directly or across a network 106. An audio capture component, such as a microphone 114 of the device 102, or another device, captures audio 1100 corresponding to a spoken utterance. The device 102, using a wake word engine 1101, then processes audio data corresponding to the audio 1100 to determine if a keyword (such as a wakeword) is detected in the audio data. Following detection of a wakeword, the device 102 processes audio data 1102 corresponding to the utterance utilizing an ASR component 144. The audio data 1102 may be output from an optional acoustic front end (AFE) 1156 located on the device prior to transmission. In other instances, the audio data 1102 may be in a different form for processing by a remote AFE 1156, such as the AFE 1156 located with the ASR component 144.

The wake word engine 1101 works in conjunction with other components of the user device, for example a microphone to detect keywords in audio 1100. For example, the device may convert audio 1100 into audio data, and process the audio data with the wake word engine 1101 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1101 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1101 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102(a) may "wake." The audio data 1102 may include data corresponding to the wakeword. Further, a local device may "wake" upon detection of speech/spoken audio above a threshold, as described herein. An ASR component 144 may convert the audio data 1102 into text. The ASR transcribes audio data into text data representing the words of the speech contained in the audio data 1102. The text data may then be used by other components for various purposes, such as executing system commands, inputting data, etc. A spoken utterance in the audio data is input to a processor configured to perform ASR which then interprets the utterance based on the similarity between the utterance and pre-established language models 1154 stored in an ASR model knowledge base (ASR Models Storage 1152). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1153 stored in an ASR Models Storage 1152), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 144 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1156 and a speech recognition engine 1158. The acoustic front end (AFE) 1156 transforms the audio data from the microphone into data for processing by the speech recognition engine 1158. The speech recognition engine 1158 compares the speech recognition data with acoustic models 1153, language models 1154, and other data models and information for recognizing the speech conveyed in the audio data. The AFE 1156 may reduce noise in the audio data and divide the digitized audio data into frames representing time intervals for which the AFE 1156 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1158 may process the output from the AFE 1156 with reference to information stored in speech/model storage (1152). Alternatively, post front-end processed data (such as feature vectors) may be received by the device executing ASR processing from another source besides the internal AFE. For example, the user device may process audio data into feature vectors (for example using an on-device AFE 1156).

The speech recognition engine 1158 attempts to match received feature vectors to language phonemes and words as known in the stored acoustic models 1153 and language models 1154. The speech recognition engine 1158 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, turn on Light A" The wake detection component may identify the wake word, otherwise described as a trigger expression, "Alexa," in the user utterance and may "wake" based on identifying the wake word. The speech recognition engine 1158 may identify, determine, and/or generate text data corresponding to the user utterance, here "turn on Light A."

The speech recognition engine 1158 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1158 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 146 may include various components, including potentially dedicated processor(s), memory, storage, etc. As shown in FIG. 11, an NLU component 146 may include a recognizer 1163 that includes a named entity recognition (NER) component 1162 which is used to identify portions of query text that correspond to a named entity that may be recognizable by the system. A downstream process called named entity resolution links a text portion to a specific entity known to the system. To perform named entity resolution, the system may utilize gazetteer information (1184a-1184n) stored in entity library storage 1182. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 144 based on the utterance input audio 1100) and attempts to make a semantic interpretation of the text. That is, the NLU process determines the meaning behind the text based on the individual words and then implements that meaning. NLU processing 146 interprets a text string to derive an intent or a desired action from the user as well as the pertinent pieces of information in the text that allow a device (e.g., device 102) to complete that action. For example, if a spoken utterance is processed using ASR 144 and outputs the text "turn on Light A" the NLU process may determine that the user intended to cause a device state of a device named Light A.

The NLU 146 may process several textual inputs related to the same utterance. For example, if the ASR 144 outputs N text segments (as part of an N-best list), the NLU may process all N outputs to obtain NLU results.

As will be discussed further below, the NLU process may be configured to parse and tag to annotate text as part of NLU processing. For example, for the text "turn on Light A," "turn on" may be tagged as a command (to perform device state transition).

To correctly perform NLU processing of speech input, an NLU process 146 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1162 receives a query in the form of ASR results and attempts to identify relevant grammars and lexical information that may be used to construe meaning. To do so, the NLU component 146 may begin by identifying potential domains that may relate to the received query. The NLU storage 1173 includes a database of devices (1174a-1174n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 1163, language model and/or grammar database (1176a-1176n), a particular set of intents/actions (1178a-1178n), and a particular personalized lexicon (1186). Each gazetteer (1184a-1184n) may include domain-indexed lexical information associated with a particular user and/or device. For example, the Gazetteer A (1184a) includes domain-index lexical information 1186aa to 1186an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1164 parses the query to determine an intent or intents for each identified domain, where the intent corresponds to the action to be performed that is responsive to the query. Each domain is associated with a database (1178a-1178n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1164 identifies potential intents for each identified domain by comparing words in the query to the words and phrases in the intents database 1178. In some instances, the determination of an intent by the IC component 1164 is performed using a set of rules or templates that are processed against the incoming text to identify a matching intent.

In order to generate a particular interpreted response, the NER 1162 applies the grammar models and lexical information associated with the respective domain to actually recognize a mention of one or more entities in the text of the query. In this manner, the NER 1162 identifies "slots" or values (i.e., particular words in query text) that may be needed for later command processing. Depending on the complexity of the NER 1162, it may also label each slot with a type of varying levels of specificity (such as noun, place, device name, device location, city, artist name, song name, amount of time, timer number, or the like). Each grammar model 1176 includes the names of entities (i.e., nouns) commonly found in speech about the particular domain (i.e., generic terms), whereas the lexical information 1186 from the gazetteer 1184 is personalized to the user(s) and/or the device. For instance, a grammar model associated with the shopping domain may include a database of words commonly used when people discuss shopping.

The intents identified by the IC component 1164 are linked to domain-specific grammar frameworks (included in 1176) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1176) framework or frameworks may correspond to sentence structures such as "purchase item called 'Item A' from Marketplace A."

For example, the NER component 1162 may parse the query to identify words as subject, object, verb, preposition, etc., based on grammar rules and/or models, prior to recognizing named entities. The identified verb may be used by the IC component 1164 to identify intent, which is then used by the NER component 1162 to identify frameworks. A framework for the intent of "play a song," meanwhile, may specify a list of slots/fields applicable to play the identified "song" and any object modifier (e.g., specifying a music collection from which the song should be accessed) or the like. The NER component 1162 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1162 may search the database of generic words associated with the domain (in the knowledge base 1172). So, for instance, if the query was "identify this song," after failing to determine which song is currently being output, the NER component 1162 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 1150. The destination speechlet 1150 may be determined based on the NLU output. For example, if the NLU output includes a command to send a message, the destination speechlet 1150 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 1150 may provide some or all of this information to a text-to-speech (TTS) engine. The TTS engine may then generate an actual audio file for outputting the audio data determined by the application (e.g., "okay," or "Light A on").

An NLG component 1151 may be utilized to inserting text into a description as described herein. NLG may include a process for producing natural language output. In examples, artificial intelligence and computational linguistics may be utilized to produce understandable texts in English or other language as appropriate from underlying non-linguistic representations of information. The NLG process may generate text to be utilized in synthesized speech using a list of canned text that available to the system at issue. In other NLG processes, multiple stages of planning and merging information to enable the generation of text that looks natural and does not become repetitive may be utilized. Those stages may include content determination, here based on the specific group name, document structuring to organize the information to be conveyed, aggregation to merge similar sentences and/or words to improve readability, lexical choice, referring expression generation to identity objects, regions, or other known items, and realization where the text to be utilized is actually created.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 146 during runtime operations where NLU operations are performed on text (such as text output from an ASR component 144). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1163. Each recognizer may include various NLU components such as an NER component 1162, IC component 1164 and other components such as an entity resolver, or other components.

For example, a messaging domain recognizer 1163-A (Domain A) may have an NER component 1162-A that identifies what slots (i.e., portions of input text) may correspond to particular words relevant to that domain. The words may correspond to entities such as (for the messaging domain) a recipient. An NER component 1162 may use a machine learning model, such as a domain specific conditional random field (CRF) to both identify the portions corresponding to an entity as well as identify what type of entity corresponds to the text portion. The messaging domain recognizer 1163-A may also have its own intent classification (IC) component 1164-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 104, as illustrated herein are exemplary, and may be located in a stand-alone device or may be included, in whole or in part, as a component of a larger device or system, may be distributed across a network or multiple devices connected by a network, etc.

Figure 12:
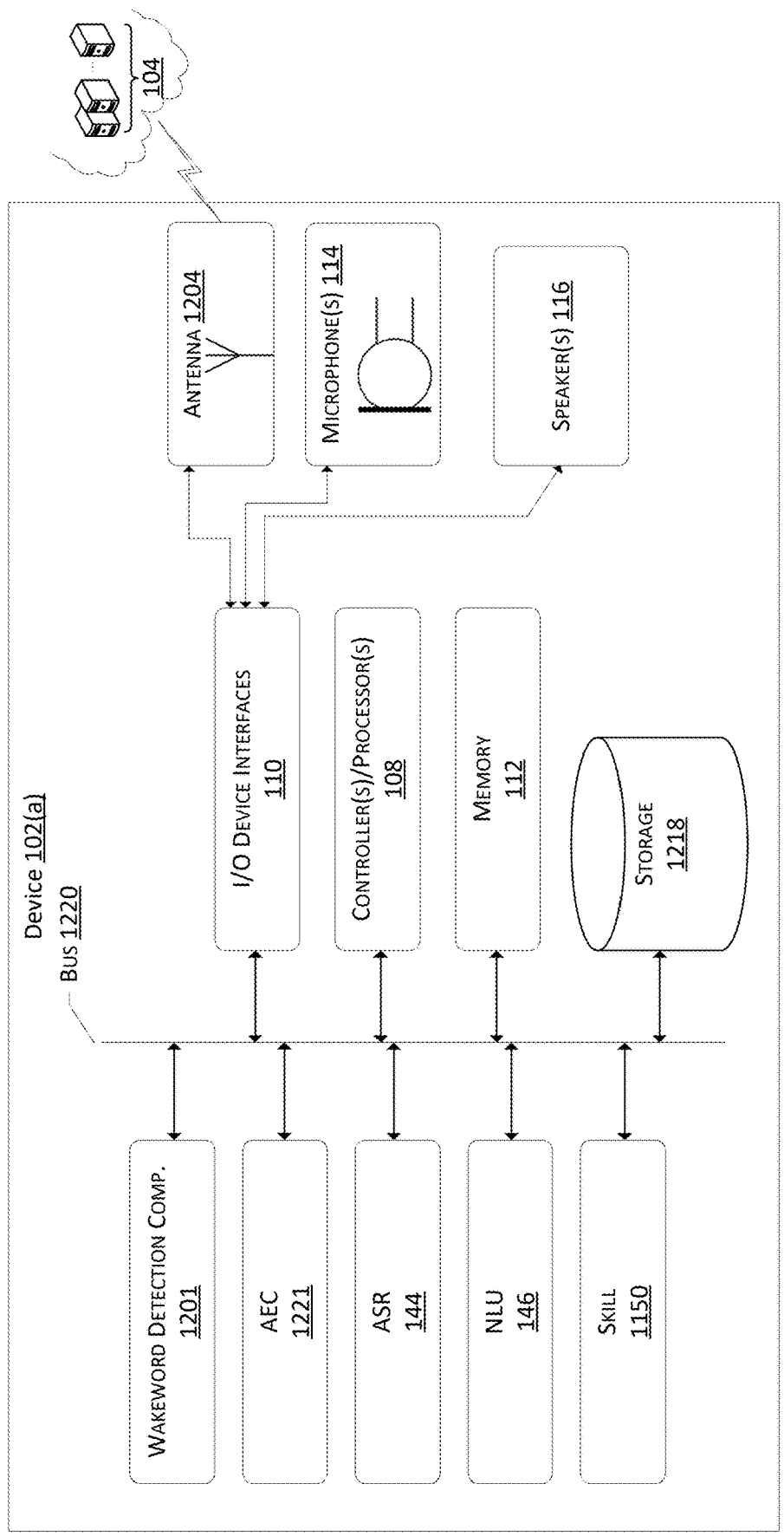
FIG. 12 illustrates a conceptual diagram of components of an example device that may utilized in association with dynamic smart device demonstration.

FIG. 12 illustrates a conceptual diagram of components of an example connected device from which sensor data may be received for device functionality control utilizing activity prediction. For example, the device may include one or more electronic devices such as voice interface devices (e.g., smart speaker devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The device 102 may be implemented as a standalone device that is relatively simple in terms of functional capabilities with limited input/output components, memory, and processing capabilities. For instance, the device 102 may not have a keyboard, keypad, touchscreen, or other form of mechanical input. In some instances, the device 102 may include a microphone 114, a power source, and functionality for sending generated audio data via one or more antennas 1204 to another device and/or system.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include input devices such as a keyboard, a mouse, a touchscreen, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 114, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 12 may include one or more controllers/processors 108, that may include a central processing unit (CPU) for processing data and computer-readable instructions, and memory 112 for storing data and instructions of the device 102. In examples, the skills and/or applications described herein may be stored in association with the memory 112, which may be queried for content and/or responses as described herein. The device 102 may also be connected to removable or external non-volatile memory and/or storage, such as a removable memory card, memory key drive, networked storage, etc., through input/output device interfaces 110.

Computer instructions for operating the device 102 and its various components may be executed by the device's controller(s)/processor(s) 108, using the memory 112 as "working" storage at runtime. A device's computer instructions may be stored in a non-transitory manner in non-volatile memory 112, storage 1218, or an external device(s). Alternatively, some or all of the executable instructions may be embedded in hardware or firmware on the device 102 in addition to or instead of software.

The device 102 may include input/output device interfaces 110. A variety of components may be connected through the input/output device interfaces 110. Additionally, the device 102 may include an address/data bus 1220 for conveying data among components of the respective device. Each component within a device 102 may also be directly connected to other components in addition to, or instead of, being connected to other components across the bus 1220.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 108 may comprise graphics processors for driving animation and video output on the associated display. As a way of indicating to a user that a connection between another device has been opened, the device 102 may be configured with one or more visual indicators, such as the light element(s), which may be in the form of LED(s) or similar components (not illustrated), that may change color, flash, or otherwise provide visible light output, such as for a notification indicator on the device 102. The input/output device interfaces 110 that connect to a variety of components. This wired or a wireless audio and/or video port may allow for input/output of audio/video to/from the device 102. The device 102 may also include an audio capture component. The audio capture component may be, for example, a microphone 114 or array of microphones, a wired headset or a wireless headset, etc. The microphone 114 may be configured to capture audio. If an array of microphones is included, approximate distance to a sound's point of origin may be determined using acoustic localization based on time and amplitude differences between sounds captured by different microphones of the array. The device 102(a) (using microphone 114, wakeword detection component 1201, ASR component 144, etc.) may be configured to generate audio data corresponding to captured audio. The device 102 (using input/output device interfaces 110, antenna 1204, etc.) may also be configured to transmit the audio data to the remote system 104 for further processing or to process the data using internal components such as a wakeword detection component 1001.

Via the antenna(s) 1204, the input/output device interface 110 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s), the system may be distributed across a networked environment. Accordingly, the device 102 and/or the system 104 may include an ASR component 144. The ASR component 144 of device 102 may be of limited or extended capabilities. The ASR component 144 may include language models stored in ASR model storage component, and an ASR component 144 that performs automatic speech recognition. If limited speech recognition is included, the ASR component 144 may be configured to identify a limited number of words, such as keywords detected by the device, whereas extended speech recognition may be configured to recognize a much larger range of words.

The device 102 and/or the system 104 may include a limited or extended NLU component 146. The NLU component 146 of device 102 may be of limited or extended capabilities. The NLU component 146 may comprise a name entity recognition module, an intent classification module and/or other components. The NLU component 146 may also include a stored knowledge base and/or entity library, or those storages may be separately located.

In examples, AEC may also be performed by the device 102. In these examples, the operations may include causing the AEC component 1221 to be enabled or otherwise turned on, or the operations may include causing the AEC component 1221 to transition from a first mode to a second mode representing a higher sensitivity to audio data generated by the microphone 114. The AEC component 1221 may utilize the audio data generated by the microphone 114 to determine if an audio fingerprint of the audio data, or portion thereof, corresponds to a reference audio fingerprint associated with the predefined event.

The device 102 and/or the system 104 may also include a speechlet 1150 that is configured to execute commands/functions associated with a spoken command as described herein. The device 102 may include a wakeword detection component 1101, which may be a separate component or may be included in an ASR component 144. The wakeword detection component 1101 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

Figure 13:
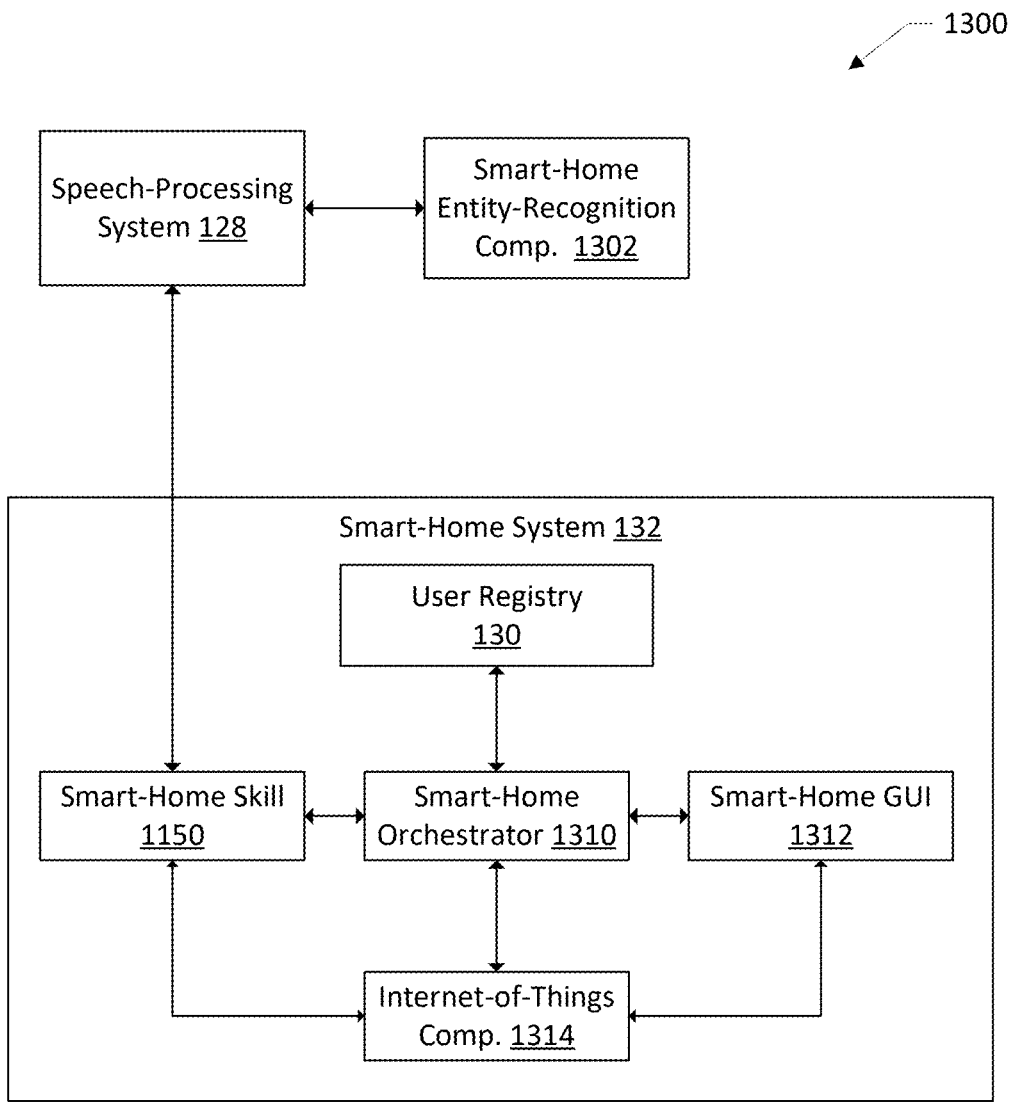
FIG. 13 illustrates a conceptual diagram of components utilized in an example smart home system.

FIG. 13 illustrates a conceptual diagram of example components of a smart-home system that may be utilized for device functionality identification. The smart home system 132 may include components described above with respect to FIG. 1. The smart home system 132 may also be configured to send data to and receive data from other components of a system and/or one or more other systems. For example, the other components may include a speech processing system 128. The smart home system 132 may also include components such as a smart-home orchestrator 1310, a smart-home graphical user interface (GUI) 1312, and/or an internet-of-things component 1314. Each of these components will be described in detail below.

As described herein, a user may interact with a smart device using tactile input to the smart device, voice input to a voice-controlled device, and/or input to an application residing on and/or accessible to a personal device. When a user interacts with a smart device using voice input to a voice-controlled device, audio data representing user utterances may be received at the speech processing system 128. The speech processing system 128 may analyze the audio data and/or corresponding text data generated, by way of example, using an ASR component, to determine that the user utterance represents an intent to control a smart device. To determine the intent associated with the user utterance, the speech processing system 128 may utilize a smart-home entity-recognition component 1302, which may be utilized to inform one or more intents available to the speech processing system 128 and/or to inform one or more values associated with the intents. For example, the user utterance of "turn off bedroom lights" may be analyzed by the speech processing system 128. The smart-home entity-recognition component 1302 may train or otherwise provide data to the speech processing system 128 indicating intents associated with operation of smart devices, such as "turn on," "turn off," "activate," "deactivate," "dim," "brighten," "lock," "unlock," etc. The smart-home entity-recognition component 1302 may additionally, or alternatively, provide data indicating identifiers and/or payloads associated with such intents, such as "light," "lights," "lock," "outlet," "switch," etc. It should be understood that while the smart-home entity-recognition component 1302 is depicted in FIG. 13 as being a component separate from the smart home system 132, the smart-home entity-recognition component 1302 may be a component of the smart home system 132.

The speech processing system 128 may be configured to determine that the intent corresponds to an operation configured to be performed by the smart home system 132, and based at least in part on such a determination, the speech processing system 128 may provide the intent data and/or other data associated with the request to the smart-home speechlet 1150 of the smart home system 132. The smart-home orchestrator 1310 may be configured to receive data indicating that the smart-home speechlet 1150 has been invoked to determine a directive to be performed with respect to a smart device and may query one or more other components of the smart home system 132 to effectuate the request. For example, the smart-home orchestrator 1310 may query the internet-of-things component 1314 to identify naming indicators associated with smart devices for a particular user account. The internet-of-things component 1314 may query data store(s) and/or the user registry 130 and/or the user account for such naming indicators.

In other examples, such as when the smart-home speechlet 1150 receives a request to discover a smart device, such as from a smart-device system, the smart-home orchestrator 1310 may query one or more components of the smart home system 132 to determine associations between smart device identifiers and user account identifiers as described herein. Additionally, or alternatively, as mentioned above, the smart devices may be operated based at least in part on input data received from an application residing on and/or accessible to a personal device, such as a mobile phone and/or computer. The smart-home GUI 1312 may be utilized to receive the input data and/or to display recommendations and/or requests to a user. For example, the smart-home GUI 1312 may be utilized to display a request to confirm that a selected smart device is the desired device to be acted upon.

Figure 14:
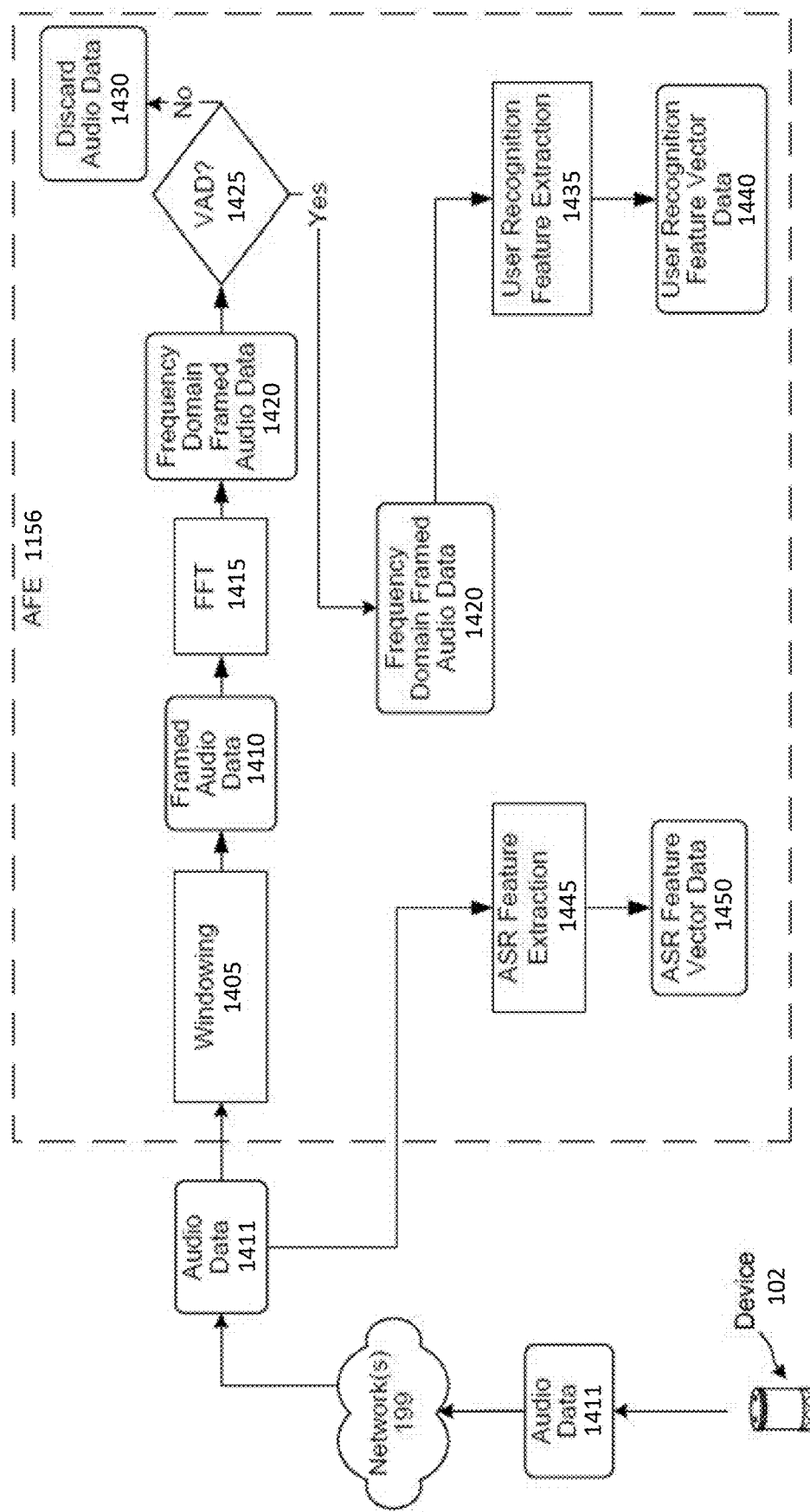
FIG. 14 is a flow diagram illustrating processing that may be performed to prepare audio data for ASR processing and user recognition processing according to embodiments of the present disclosure.

FIG. 14 illustrates processing that may be performed to prepare the audio data 1411 for ASR processing and user recognition processing. As described, the device 102 sends the audio data 1411 through a network(s) 199 to the system(s) for processing. The system(s) may include an acoustic front end (AFE) 1156 (or other component(s)) that performs various functions on the audio data 1411 to prepare the audio data 1411 for further downstream processing, such as ASR processing and/or user recognition processing. For example, the AFE 1156 may include a windowing component 1405 that performs windowing functions on the audio data 1411 to create framed audio data 1410 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 1156 may include a fast Fourier transform (FFT) component 1415 configured to perform FFT to convert the waveforms in each frame of the framed audio data 1410 from its original domain (e.g., time) to a representation in a frequency domain (thereby creating frequency domain framed audio data 1420). Audio processing techniques other than or in addition to FFT may be used to transform audio data (e.g., waveforms) into data that can be processed as needed.

The AFE 1156 may include a voice activity detection (VAD) component 1425 that determines whether voice activity (i.e., speech) is present in the post-FFT waveforms (i.e., frequency domain framed audio data 1420). In doing so, the system(s) may perform VAD operations discussed above. The VAD detector (or other component) may be configured in a different order, for example the VAD detector may operate on the audio data 1011 rather than on the frequency domain framed audio data 1420, may operate on ASR features, etc. Various different configurations of components are possible. If there is no speech in the frequency domain framed audio data 1420, the system(s) discards (1430) the frequency domain framed audio data 1405 (i.e., removes the audio data from the processing stream). If, instead, the system(s) detects speech in the frequency domain framed audio data 1420, the system(s) executes a user recognition feature extraction component 1435 with respect to the frequency domain framed audio data 1420.

The user recognition feature extraction component 1435 may perform frame level feature extraction and/or utterance level feature extraction. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature vector data 1440). The user recognition feature extraction component 1435 may continue to process until voice activity is no longer detected in the frequency domain framed audio data 1420, at which point the system(s) may determine that an endpoint of the speech has been reached.

An ASR feature extraction component 1445 may perform ASR feature extraction on all of the audio data 1411 received from the device 102. Alternatively (not illustrated), the ASR feature extraction component 1445 may only perform ASR feature extraction on audio data including speech (e.g., as indicated by the VAD component 1425). The ASR feature extraction component 1445 and/or the user recognition feature extraction component 1435 may determine values (i.e., features) representing qualities of the frequency domain framed audio data 1420, along with quantitating those features into values (i.e., feature vectors or audio feature vectors). The ASR feature extraction component 1445 may determine ASR feature vector data 1450 useful for ASR processing, and the user recognition feature extraction component 1435 may determine user recognition feature vector data 1440 (sometimes called an i-vector) useful for user recognition processing. The ASR feature vector data 1450 and the user recognition feature vector data 1440 may be the same feature vectors, different feature vectors, or may include some overlapping features. A number of approaches may be used to extract feature vectors from the frequency domain framed audio data 1420, such as MFCCs, PLP techniques, neural network feature vector techniques, linear discriminant analysis, semi-tied covariance matrices, or other approaches known to those skilled in the art.

The ASR feature vector data 1450 may include a different audio feature vector for each audio frame. Thus, for one 25 ms long audio frame, the ASR feature extraction component 1445 may output a single ASR feature vector. The ASR feature vector data 1450 may be input to the ASR component 144.

Depending on system configuration, the user recognition feature extraction component 1435 may output multiple user recognition feature vectors, for example one such vector for each audio frame. Alternatively, the user recognition feature extraction component 1435 may continue to input the frequency domain framed audio data 1420 while the utterance is ongoing (e.g., before the endpoint of the speech is reached in the audio data 1411). While the frequency domain framed audio data 1420 is input, the user recognition feature extraction component 1435 may accumulate or otherwise combine the frequency domain framed audio data 1420 as it comes in. That is, for a certain frame's worth of frequency domain framed audio data 1420 that comes in, the user recognition feature extraction component 1435 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition feature extraction component 1435 may depend on what audio qualities are determined to be important for ultimate user recognition processing. Thus, the user recognition feature extraction component 1435 may be trained to isolate and process data that is most useful for user recognition processing. The output of the user recognition feature extraction component 1435 may thus include user recognition feature vector data 1440 that includes values for features useful for user recognition processing. The resulting user recognition feature vector data 1440 may be input to the user recognition engine 999.

The user recognition feature vector data 1440 may include multiple vectors each corresponding to different portions of a spoken user input. Alternatively, the user recognition feature vector data 1440 may be a single vector representing audio qualities of the spoken user input.

Figure 15:
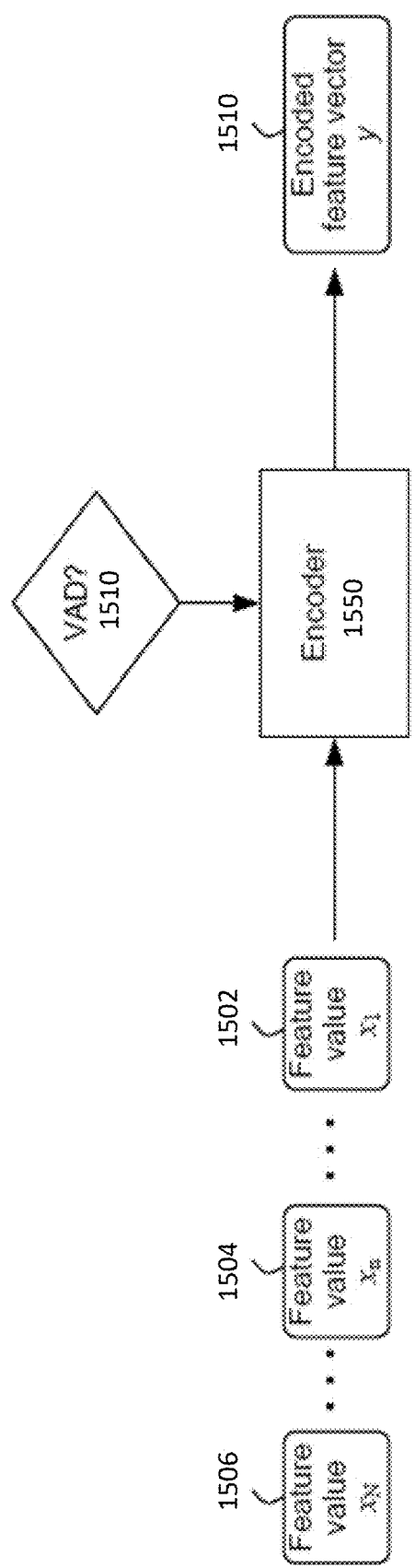
FIG. 15 is a diagram of a vector encoder according to embodiments of the present disclosure.

Referring to FIG. 15, the single vector may be created using an encoder 1550, which can create a fixed-size vector to represent certain characteristics of the audio data as described below. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on use of the encoded vector and other system configurations. As shown in FIG. 15, feature values 1502 through 1506 (which may include feature vectors of the audio data 1411, the frequency domain framed audio data 1420, or the like) may be input into an encoder 1550, which will output an encoded feature vector 1510 that represents the input feature values. Output of the VAD component 1425 may be an input into the encoder 1550 such that the encoder 1550 may only operate when feature values input therein correspond to speech. The individual feature values (e.g., 1502-1506) may correspond to specific audio frames. Regardless of how many feature values are input, any particular encoder 1550 will be configured to output vectors of the same size, thus ensuring a continuity of output encoded vector size from any particular encoder 1550 (though different encoders may output vectors of different fixed sizes) and enabling comparing different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder 1550 may be implemented as a neural network (NN), recurrent neural network (RNN), GMM, or other model. One particular example is a long short-term memory (LSTM) RNN. There are a variety of ways for the encoder 1550 to consume data input therein, including but not limited to:

linear, one direction (forward or backward),
    bi-linear, essentially the concatenation of a forward and a backward embedding, or
    tree, based on parse-tree of the sequence.

In addition, an attention model can be used, which is another RNN or deep neural network (DNN) that learns to "attract" attention to certain parts of the input. The attention model can be used in combination with the above methods of consuming the input.

FIG. 15 illustrates operation of the encoder 1550. The input feature value sequence, starting with feature value $x_1$ 1502, continuing through feature value $x_n$ 1504, and concluding with feature value $x_N$ 1506 is input into the encoder 1550. The encoder 1550 may process the input feature values as noted above. The encoder 1550 outputs the encoded feature vector y 1510, which is a fixed length feature vector of length F. Thus, the user recognition feature extraction component 1435 may include an encoder 1550 that receives audio feature values for a particular spoken user input, and outputs a fixed length encoded feature vector y 1510, which may be the user recognition feature/vector data 1440. Thus, in certain system configurations, no matter how long the spoken user input is, or how many acoustic frames worth of feature values are input into the encoder 1550, the output feature vector 1510/1440 will be of the same length, thus allowing for more ease of performing user recognition processing by the user recognition engine 999. To allow for robust system operation, a final vector 1510/

1440 may include many dimensions (e.g., several hundred), thus providing many datapoints for downstream consideration.

To determine the user recognition feature vector data 1440, the system(s) may (for example using the VAD component 1425) determine that voice activity is detected in input audio data. This may indicate the beginning of the spoken user input, thus resulting in the system(s) determining that the spoken user input starts at a first point in audio data. Audio processing (for example performed by the windowing component 1405, the FFT component 1415, the ASR feature extraction component 1445, the user recognition feature extraction component 1435, ASR processing, or the like) may continue on audio data starting at the first point and continuing until the VAD component 1425 determines that voice activity is no longer detected at a second point in audio data. Thus, the system(s) may determine that the spoken user input ends at the second point. Thus, the first point may be considered the beginpoint of the spoken user input and the second point may be considered the endpoint of the spoken user input. The VAD component 1425 may signal the user recognition feature extraction component 1435 when the beginpoint and/or endpoint is detected so that the user recognition feature extraction component 1435 may begin processing audio data starting at the beginpoint and ending at the endpoint. Further, audio frames during the spoken user input that do not include speech may be filtered out by the VAD component 1425 and thus not considered by the ASR feature extraction component 1445 and/or the user recognition feature extraction component 1435. The resulting accumulated/processed speech audio data (from beginpoint to endpoint) may then be represented in a single feature vector for the user recognition feature vector data 1440, which may then be used for user recognition processing.

Figure 16:
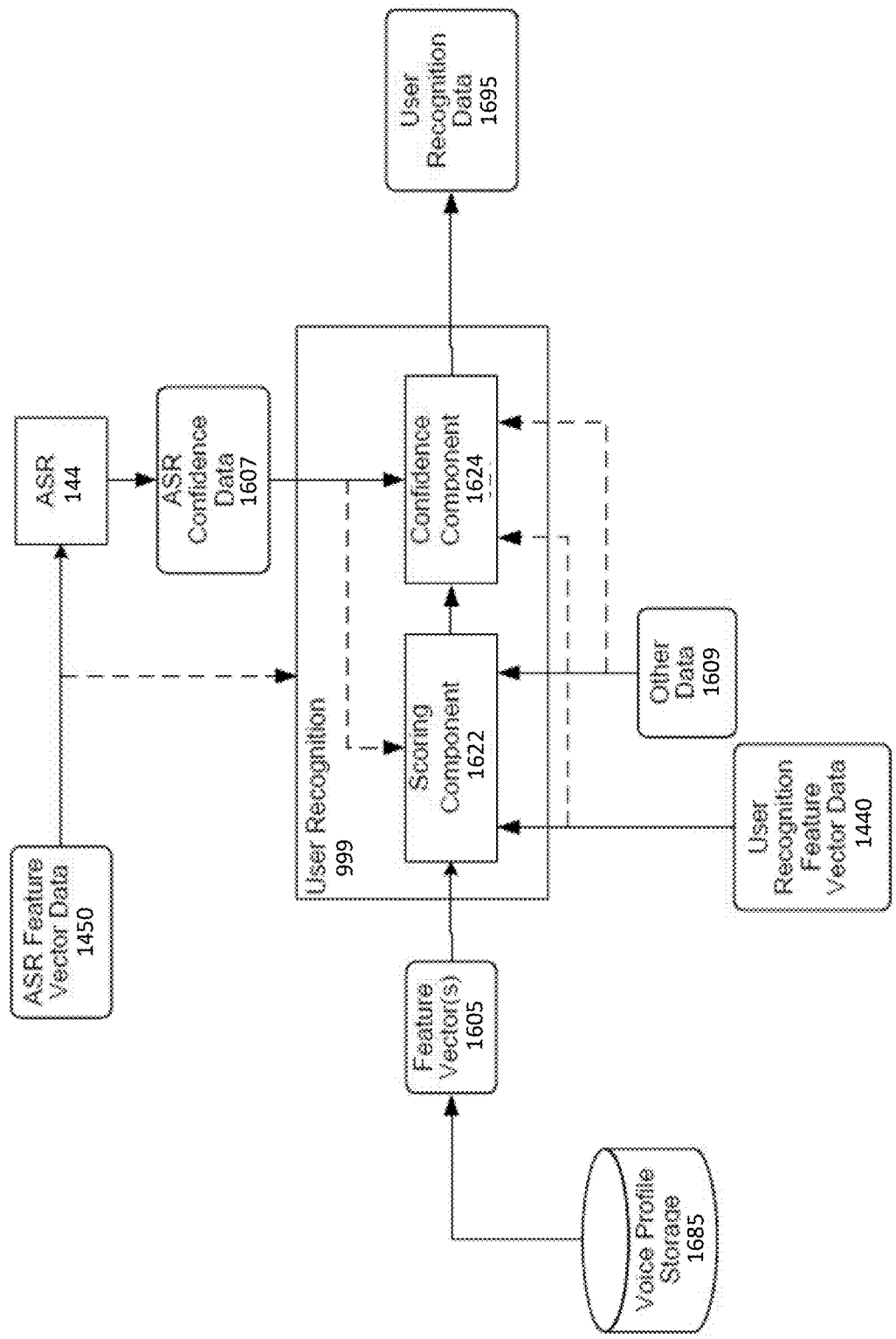
FIG. 16 is a system flow diagram illustrating user recognition according to embodiments of the present disclosure.

FIG. 16 illustrates user recognition processing as may be performed by a user recognition engine 999. The ASR component 144 performs ASR processing on the ASR feature vector data 1450 as described above. ASR confidence data 1607 may be passed to the user recognition engine 999.

The user recognition engine 999 performs user recognition using various data including the user recognition feature vector data 1440, feature vectors 1605 representing explicit and/or anonymous voice profiles, the ASR confidence data 1607, and other data 1609. The user recognition engine 999 may output the user recognition data 1695, which reflects a certain confidence that the user input was spoken by one or more particular users. The user recognition data 1695 may include one or more user identifiers (e.g., corresponding to one or more explicit voice profiles and/or one or more anonymous voice profiles). Each user identifier in the user recognition data 1695 may be associated with a respective confidence value, representing a likelihood that the user input corresponds to the user identifier. A confidence value may be a numeric or binned value.

The feature vector(s) 1605 input to the user recognition engine 999 may correspond to one or more anonymous voice profiles and/or one or more explicit voice profiles. The user recognition engine 999 may use the feature vector(s) 1605 to compare against the user recognition feature vector 1440, representing the present user input, to determine whether the user recognition feature vector 1440 corresponds to one or more of the feature vectors 1605 of the anonymous and/or explicit voice profiles.

Each feature vector 1605 may be the same size as the user recognition feature vector 1440. For example, if the user recognition feature vector 1404 is of size F (for example encoded by the encoder 1550), a feature vector 1605 may also be of size F.

To perform user recognition, the user recognition engine 999 may determine the device 102 from which the audio data 1411 originated. For example, the audio data 1411 may be associated with metadata including a device identifier representing the device 102. Either the device 102 or the system(s) may generate the metadata. The system(s) may determine a group profile identifier associated with the device identifier, may determine user identifiers associated with the group profile identifier, and may include the group profile identifier and/or the user identifiers in the metadata. The system(s) may associate the metadata with the user recognition feature vector 1440 produced from the audio data 1411. The user recognition engine 999 may send a signal to the voice profile storage 1685, with the signal requesting only audio data and/or feature vectors 1605 (depending on whether audio data and/or corresponding feature vectors are stored) associated with the device identifier, the group profile identifier, and/or the user identifiers represented in the metadata. This limits the universe of possible feature vectors 1605 the user recognition engine 999 considers at runtime and thus decreases the amount of time to perform user recognition processing by decreasing the amount of feature vectors 1605 needed to be processed. Alternatively, the user recognition engine 999 may access all (or some other subset of) the audio data and/or feature vectors 1605 available to the user recognition engine 999. However, accessing all audio data and/or feature vectors 1205 will likely increase the amount of time needed to perform user recognition processing based on the magnitude of audio data and/or feature vectors 1605 to be processed.

If the user recognition engine 999 receives audio data from the voice profile storage 1685, the user recognition engine 999 may generate one or more feature vectors 1605 corresponding to the received audio data.

The user recognition engine 999 may attempt to identify the user that spoke the speech represented in the audio data 1411 by comparing the user recognition feature vector 1440 to the feature vector(s) 1605. The user recognition engine 999 may include a scoring component 1622 that determines respective scores indicating whether the user input (represented by the user recognition feature vector 1440) was spoken by one or more particular users (represented by the feature vector(s) 1605). The user recognition engine 999 may also include a confidence component 1624 that determines an overall accuracy of user recognition processing (such as those of the scoring component 1622) and/or an individual confidence value with respect to each user potentially identified by the scoring component 1622. The output from the scoring component 1622 may include a different confidence value for each received feature vector 1605. For example, the output may include a first confidence value for a first feature vector 1605*a* (representing a first anonymous or explicit voice profile), a second confidence value for a second feature vector 1605*b* (representing a second anonymous or explicit voice profile), etc. Although illustrated as two separate components, the scoring component 1622 and the confidence component 1624 may be combined into a single component or may be separated into more than two components.

The scoring component 1622 and the confidence component 1624 may implement one or more trained machine learning models (such neural networks, classifiers, etc.) as known in the art. For example, the scoring component 1622 may use probabilistic linear discriminant analysis (PLDA)

techniques. PLDA scoring determines how likely it is that the user recognition feature vector 1440 corresponds to a particular feature vector 1605. The PLDA scoring may generate a confidence value for each feature vector 1605 considered and may output a list of confidence values associated with respective user identifiers, anonymous voice profile identifiers, and/or explicit voice profile identifiers. The scoring component 1622 may also use other techniques, such as GMMs, generative Bayesian models, or the like, to determine confidence values.

The confidence component 1624 may input various data including information about the ASR confidence 1607, speech length (e.g., number of frames or other measured length of the user input), audio condition/quality data (such as signal-to-interference data or other metric data), fingerprint data, image data, or other factors to consider how confident the user recognition engine 999 is with regard to the confidence values linking users to the user input. The confidence component 1624 may also consider the confidence values and associated identifiers output by the scoring component 1622. For example, the confidence component 1624 may determine that a lower ASR confidence 1607, or poor audio quality, or other factors, may result in a lower confidence of the user recognition engine 999. Whereas a higher ASR confidence 1607, or better audio quality, or other factors, may result in a higher confidence of the user recognition engine 999. Precise determination of the confidence may depend on configuration and training of the confidence component 1624 and the model(s) implemented thereby. The confidence component 1624 may operate using a number of different machine learning models/techniques such as GMM, neural networks, etc. For example, the confidence component 1624 may be a classifier configured to map a score output by the scoring component 1622 to a confidence value.

The user recognition engine 999 may output user recognition data 1695 specific to a single user identifier, anonymous voice profile identifier, or explicit voice profile identifier (or one or more user identifiers, one or more anonymous voice profile identifiers, and/or one or more explicit voice profile identifiers in the form of an N-best list). For example, the user recognition engine 999 may output user recognition data 1695 with respect to each received feature vector 1605. The user recognition data 1695 may include numeric confidence values (e.g., 0.0-1.0, 0-1000, or whatever scale the system is configured to operate). Thus the user recognition data 1695 may output an N-best list of potential users with numeric confidence values (e.g., user identifier 123—0.2, anonymous voice profile identifier 234—0.8). Alternatively or in addition, the user recognition data 1695 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition engine 999 may output an N-best list of potential users with binned confidence value (e.g., user identifier 123—low, anonymous voice profile identifier 234—high). Combined binned and numeric confidence value outputs are also possible. Rather than a list of identifiers and their respective confidence values, the user recognition data 1695 may only include information related to the top scoring identifier as determined by the user recognition engine 999. The user recognition engine 999 may also output an overall confidence value that the individual confidence values are correct, where the overall confidence value indicates how confident the user recognition engine 999 is in the output results. The overall confidence value may be determined by the confidence component 1224.

The confidence component 1624 may determine differences between individual confidence values when determining the user recognition data 1695. For example, if a difference between a first confidence value and a second confidence value is large, and the first confidence value is above a threshold confidence value, then the user recognition engine 999 is able to recognize a first user (associated with the feature vector 1605 associated with the first confidence value) as the user that spoke the user input with a much higher confidence than if the difference between the confidence values were smaller.

The user recognition engine 999 may perform thresholding to avoid incorrect user recognition data 1695 being output. For example, the user recognition engine 999 may compare a confidence value output by the confidence component 1624 to a threshold confidence value. If the confidence value does not satisfy (e.g., does not meet or exceed) the threshold confidence value, the user recognition engine 999 may not output user recognition data 1695, or may only include in that data 1695 an indicator that a user speaking the user input could not be recognized. Further, the user recognition engine 999 may not output user recognition data 1695 until enough user recognition feature vector data 1640 is accumulated and processed to verify a user above a threshold confidence value. Thus the user recognition engine 999 may wait until a sufficient threshold quantity of audio data of the user input has been processed before outputting user recognition data 1695. The quantity of received audio data may also be considered by the confidence component 1624.

The user recognition engine 999 may be defaulted to output binned (e.g., low, medium, high) user recognition confidence values. However, such may be problematic in certain situations. For example, if the user recognition engine 999 computes a single binned confidence value for multiple feature vectors 1605, the system may not be able to effectively determine which user originated the user input. In this situation, the user recognition engine 999 may be configured to override its default setting and output numeric confidence values. This enables the system to determine a user, associated with the highest numeric confidence value, originated the user input.

The user recognition engine 999 may use other data 1609 to inform user recognition processing. A trained model(s) or other component of the user recognition engine 999 may be trained to take other data 1609 as an input feature when performing user recognition processing. Other data 1609 may include a variety of data types depending on system configuration and may be made available from other sensors, devices, or storage. The other data 1609 may include a time of day at which the audio data 1411 was generated by the device 102 or received from the device 102, a day of a week in which the audio data audio data 1411 was generated by the device 102 or received from the device 102, etc.

The other data 1609 may include image data or video data. For example, facial recognition may be performed on image data or video data received from the device 102 from which the audio data 1411 was received (or another device). Facial recognition may be performed by the user recognition engine 999, or another component of the system(s). The output of facial recognition processing may be used by the user recognition engine 999. That is, facial recognition output data may be used in conjunction with the comparison of the user recognition feature vector 1440 and one or more feature vectors 1605 to perform more accurate user recognition processing.

The other data 1609 may include location data of the device 102. The location data may be specific to a building within which the device 102 is located. For example, if the device 102 is located in user A's bedroom, such location may increase a user recognition confidence value associated with user A and/or decrease a user recognition confidence value associated with user B.

The other data 1609 may include data indicating a type of the device 102. Different types of devices may include, for example, a smart watch, a smart phone, a tablet computer, and a vehicle. The type of the device 102 may be indicated in a profile associated with the device 102. For example, if the device 102 from which the audio data 1411 was received is a smart watch or vehicle belonging to a user A, the fact that the device 102 belongs to user A may increase a user recognition confidence value associated with user A and/or decrease a user recognition confidence value associated with user B.

The other data 1609 may include geographic coordinate data associated with the device 102. For example, a group profile associated with a vehicle may indicate multiple users (e.g., user A and user B). The vehicle may include a global positioning system (GPS) indicating latitude and longitude coordinates of the vehicle when the audio data 1411 is generated by the vehicle. As such, if the vehicle is located at a coordinate corresponding to a work location/building of user A, such may increase a user recognition confidence value associated with user A and/or decrease user recognition confidence values of all other users indicated in a group profile associated with the vehicle. Global coordinates and associated locations (e.g., work, home, etc.) may be indicated in a profile associated with the device 102. The global coordinates and associated locations may also or alternatively be associated with one or more user profiles.

The other data 1609 may include data representing activity of a particular user that may be useful in performing user recognition processing. For example, if a user has recently entered a code to disable a home security alarm, and the audio data 1411 was received from a device 102 represented in a group profile associated with the home, signals from the home security alarm about the disabling user, time of disabling, etc. may be reflected in the other data 1609 and considered by the user recognition engine 999. If a mobile device (such as a smart phone, Tile, dongle, or other device) known to be associated with a particular user is detected proximate to (for example physically close to, connected to the same WiFi network as, or otherwise nearby) the device 102, this may be reflected in the other data 1609 and considered by the user recognition engine 999.

Depending on system configuration, the other data 1609 may be configured to be included in the user recognition feature vector data 1440 (for example using the encoder 1550) so that all the data relating to the user input to be processed by the scoring component 1622 may be included in a single feature vector. Alternatively, the other data 1609 may be reflected in one or more different data structures to be processed by the scoring component 1622.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The foregoing illustrates processes that may be performed at runtime to recognize a user that spoke a user input. As indicated previously, the system(s) may be configured to update voice profiles during offline operations. Such voice profile updating may use audio data representing previous spoken user inputs, which were not requested by the system(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method, comprising:
   receiving, from a first device, user input data corresponding to a request to demonstrate functionality of a second device;
   determining, utilizing device data from the first device, the second device;
   determining a functionality of the second device to demonstrate;

determining first data representing a description of the functionality of the second device;
sending the first data such that at least one of the first device or another device outputs content based on the first data;
sending a first directive configured to cause the second device to demonstrate the functionality;
generating second data indicating a device state at a time when the user input data corresponding to the request is received;
determining that the second device demonstrated the functionality utilizing the first directive; and
based at least in part on determining that the second device demonstrated the functionality and utilizing the second data, sending a second directive configured to cause the second device to transition back to the device state.

2. The method of claim 1, further comprising:
determining a first device group that includes the first device and a second device group with a portion of devices other than the first device;
causing the first device to output a request to select the first device group or the second device group;
receiving user input data indicating selection of the first device group, the first device group including the second device; and
wherein sending the first data and sending the directive comprises sending the first data and sending the directive based at least in part on the user input data indicating the selection of the first device group.

3. The method of claim 1, further comprising:
determining a device routine associated with at least a portion of devices;
determining, for the device routine, second data representing a description of the device routine;
sending the second data such that the first device outputs the second data; and
sending a second directive configured to cause the at least the portion of the devices to transition device states in a manner that corresponds to device state transitions performed when the device routine is performed.

4. The method of claim 1, further comprising:
determining, utilizing speaker recognition processing, a user profile associated with a user that provided the user input data;
determining, based at least in part on the user profile, prior device state transition requests received at the first device in association with the user profile;
determining, from the prior device state transition requests, that the functionality of the second device has yet to be utilized in association with the user profile; and
selecting the functionality from multiple functionalities of the second device to demonstrate based at least in part on determining the functionality of the second device has yet to be utilized in association with the user profile.

5. The method of claim 1, further comprising:
receiving feedback data associated with prior device demonstrations, the feedback data indicating device characteristics of previously demonstrated reference devices associated with user input indicated as favorable by a user;
determining that the second device includes the device characteristics; and
selecting the second device to demonstrate the functionality based at least in part on the second device including the device characteristics.

6. The method of claim 1, further comprising:
determining a set of devices associated with a physical environment where the first device is situated, wherein determining the set of the devices is based at least in part on second data indicating the first device has been previously utilized at least a threshold number of times to control the set of the devices;
identifying the set of the devices as a device group;
causing the first device to output a request to select the device group for performing the demonstration;
receiving user input data indicating selection of the device group, the device group including the second device; and
wherein sending the first data and sending the directive comprises sending the first data and sending the directive based at least in part on the user input data indicating the selection of the device group.

7. The method of claim 1, further comprising:
determining, based at least in part on receiving the user input data, that a user device is within an environment where the first device is situated;
determining that the user device has stored thereon an application associated with the first device;
based at least in part on the user device having the application stored thereon, sending second data to the user device, the second data configured to cause the application to display options for demonstrating the functionality;
receiving, from the user device, third data indicating a selection of the functionality to demonstrate; and
selecting the second device to demonstrate the functionality based at least in part on the third data.

8. A system, comprising:
one or more processors; and
non-transitory computer-readable media storing computer-executable instructions that, when executed by the one or more processors, cause the one or more processors to perform operations comprising:
receiving, from a first device, user input data corresponding to a request to demonstrate functionality of a second device;
determining, utilizing device data from the first device, the second device;
determining a functionality of the second device to demonstrate;
determining first data representing a description of the functionality of the second device;
sending the first data such that at least one of the first device or another device outputs content based on the first data;
sending a first directive configured to cause the second device to demonstrate the functionality;
determining, utilizing speaker recognition processing, a user profile associated with a user that provided the user input data;
determining, based at least in part on the user profile, prior device state transition requests received at the first device in association with the user profile;
determining, from the prior device state transition requests, that the functionality of the second device has yet to be utilized in association with the user profile; and
selecting the functionality from multiple functionalities of the second device to demonstrate based at least in part on determining the functionality of the second device has yet to be utilized in association with the user profile.

9. The system of claim 8, the operations further comprising:
   determining a first device group that includes the first device and a second device group with a portion of devices other than the first device;
   causing the first device to output a request to select the first device group or the second device group;
   receiving user input data indicating selection of the first device group, the first device group including the second device; and
   wherein sending the first data and sending the directive comprises sending the first data and sending the directive based at least in part on the user input data indicating the selection of the first device group.

10. The system of claim 8, the operations further comprising:
    determining a device routine associated with at least a portion of devices;
    determining, for the device routine, second data representing a description of the device routine;
    sending the second data such that the first device outputs the second data; and
    sending a second directive configured to cause the at least the portion of the devices to transition device states in a manner that corresponds to device state transitions performed when the device routine is performed.

11. The system of claim 8, the operations further comprising:
    receiving feedback data associated with prior device demonstrations, the feedback data indicating device characteristics of previously demonstrated reference devices associated with positive user input;
    determining that the second device includes the device characteristics; and
    selecting the second device to demonstrate the functionality based at least in part on the second device including the device characteristics.

12. The system of claim 8, the operations further comprising:
    determining that demonstration of a first group of devices associated with a first environment has concluded;
    determining that a user has moved into a second environment associated with a second group of devices to be demonstrated; and
    initiating demonstration of functionality for the second group of devices based at least in part on the user having moved into the second environment.

13. The system of claim 8, wherein the device data includes a service set identifier (SSID) associated with devices that are proximate to the first device.

14. The system of claim 8, the operations further comprising:
    determining, utilizing speaker recognition processing, a user profile associated with a user that provided the user input data;
    determining that the user profile differs from one or more profiles associated with account data for the first device; and
    wherein determining the functionality of the second device to demonstrate is based at least in part on the user profile differing from the one or more profiles associated with the account data for the first device.

15. A method, comprising:
    receiving, from a first device, user input data corresponding to a request to demonstrate functionality of a second device;
    determining, utilizing device data from the first device, the second device;
    determining a functionality of the second device to demonstrate;
    determining first data representing a description of the functionality of the second device;
    sending the first data such that at least one of the first device or another device outputs content based on the first data;
    sending a first directive configured to cause the second device to demonstrate the functionality;
    determining, based at least in part on receiving the user input data, that a user device is within an environment where the first device is situated;
    determining that the user device has stored thereon an application associated with the first device;
    based at least in part on the user device having the application stored thereon, sending second data to the user device, the second data configured to cause the application to display options for demonstrating the functionality;
    receiving, from the user device, third data indicating a selection of the functionality to demonstrate; and
    selecting the second device to demonstrate the functionality based at least in part on the third data.

16. The method of claim 15, further comprising:
    determining a first device group that includes the first device and a second device group with a portion of devices other than the first device;
    causing the first device to output a request to select the first device group or the second device group;
    receiving user input data indicating selection of the first device group, the first device group including the second device; and
    wherein sending the first data and sending the directive comprises sending the first data and sending the directive based at least in part on the user input data indicating the selection of the first device group.

17. The method of claim 15, further comprising:
    determining a device routine associated with at least a portion of devices;
    determining, for the device routine, second data representing a description of the device routine;
    sending the second data such that the first device outputs the second data; and
    sending a second directive configured to cause the at least the portion of the devices to transition device states in a manner that corresponds to device state transitions performed when the device routine is performed.

18. The method of claim 15, further comprising:
    determining, utilizing speaker recognition processing, a user profile associated with a user that provided the user input data;
    determining, based at least in part on the user profile, prior device state transition requests received at the first device in association with the user profile;
    determining, from the prior device state transition requests, that the functionality of the second device has yet to be utilized in association with the user profile; and
    selecting the functionality from multiple functionalities of the second device to demonstrate based at least in part on determining the functionality of the second device has yet to be utilized in association with the user profile.

19. The method of claim 15, further comprising:

receiving feedback data associated with prior device demonstrations, the feedback data indicating device characteristics of previously demonstrated reference devices associated with user input indicated as favorable by a user;

determining that the second device includes the device characteristics; and selecting the second device to demonstrate the functionality based at least in part on the second device including the device characteristics.

20. The method of claim 15, further comprising:

determining a set of devices associated with a physical environment where the first device is situated, wherein determining the set of the devices is based at least in part on second data indicating the first device has been previously utilized at least a threshold number of times to control the set of the devices;

identifying the set of the devices as a device group;

causing the first device to output a request to select the device group for performing the demonstration;

receiving user input data indicating selection of the device group, the device group including the second device; and wherein sending the first data and sending the directive comprises sending the first data and sending the directive based at least in part on the user input data indicating the selection of the device group.

* * * * *